(12) United States Patent
Hernandez Sanchez et al.

(10) Patent No.: US 10,587,426 B2
(45) Date of Patent: Mar. 10, 2020

(54) SYSTEM AND METHOD FOR OPTIMIZING REVENUE THROUGH BANDWIDTH UTILIZATION MANAGEMENT

(71) Applicant: AT&T Intellectual Property I, L.P., Atlanta, GA (US)

(72) Inventors: Ivan Dario Hernandez Sanchez, San Mateo, CA (US); Roderic Paulk, Wylie, TX (US)

(73) Assignee: AT&T Intellectual Property I, L.P., Atlanta, GA (US)

(*) Notice: Subject to any disclaimer, the term of this patent is extended or adjusted under 35 U.S.C. 154(b) by 0 days.

(21) Appl. No.: 15/982,485

(22) Filed: May 17, 2018

(65) Prior Publication Data

US 2019/0356498 A1 Nov. 21, 2019

(51) Int. Cl.
*H04M 11/00* (2006.01)
*H04L 12/14* (2006.01)
*H04L 12/26* (2006.01)
*G06Q 30/02* (2012.01)

(52) U.S. Cl.
CPC ........ *H04L 12/1496* (2013.01); *H04L 12/141* (2013.01); *H04L 12/1435* (2013.01); *H04L 12/1489* (2013.01); *H04L 43/0894* (2013.01); *G06Q 30/0223* (2013.01)

(58) Field of Classification Search
CPC . H04L 41/0896; H04L 43/0876; H04L 43/16; H04W 28/08; H04W 28/20
See application file for complete search history.

(56) References Cited

U.S. PATENT DOCUMENTS 7,447,646 B1 11/2008 Agarwal et al.
8,104,054 B2 1/2012 Weaver et al.
(Continued)

FOREIGN PATENT DOCUMENTS

WO 2011160113 A2 12/2011

OTHER PUBLICATIONS

Lang, Karl et al., "A Pricing Mechanism for Digital Content Distribution Over Peer-to-Peer Networks", Proceedings of the 38th Hawaii International Conference on System Sciences—2005, IEEE, 2005, pp. 1-9.
(Continued)

*Primary Examiner* — Khalid W Shaheed
(74) *Attorney, Agent, or Firm* — Guntin & Gust, PLC; Robert Gingher

(57) ABSTRACT

Aspects of the subject disclosure may include, for example, determining a bandwidth utilization of a network, obtaining a request provided by equipment of a user to access requested network content by way of the network, and adjusting, responsive to the bandwidth utilization exceeding a threshold, a data service price for transporting the requested network content to the equipment of the user. A notification of the adjusted data service price is forwarded to the equipment of the user, and an updated request is obtained from the equipment o the user for providing the requested network content, wherein the updated request is responsive to the notification of the adjusted data service price. Transport of the requested network content to the equipment of the user is facilitated according to the updated request. Other embodiments are disclosed.

20 Claims, 11 Drawing Sheets

(56) References Cited

U.S. PATENT DOCUMENTS

| | | | |
|---|---|---|---|
| 8,145,219 B2* | 3/2012 | Karaoguz | H04L 29/06027 |
| | | | 370/331 |
| 8,301,513 B1 | 10/2012 | Peng et al. | |
| 8,332,484 B2 | 12/2012 | Afergan et al. | |
| 9,218,621 B2 | 12/2015 | Raciborski et al. | |
| 9,489,666 B2 | 11/2016 | Sundar et al. | |
| 9,526,032 B2 | 12/2016 | Ely et al. | |
| 9,544,195 B1* | 1/2017 | Garg | H04L 47/627 |
| 9,672,528 B2 | 6/2017 | Sillerman | |
| 2002/0178255 A1 | 11/2002 | Hobart | |
| 2008/0005113 A1 | 1/2008 | Li | |
| 2008/0120416 A1 | 5/2008 | Hopkins et al. | |
| 2008/0154798 A1 | 6/2008 | Valz | |
| 2009/0037968 A1 | 2/2009 | Liu et al. | |
| 2009/0055471 A1* | 2/2009 | Kozat | H04L 65/4084 |
| | | | 709/203 |
| 2009/0259532 A1 | 10/2009 | Bergstraesser et al. | |
| 2013/0246207 A1 | 9/2013 | Novak et al. | |
| 2014/0179265 A1 | 6/2014 | Bruns et al. | |
| 2016/0099838 A1 | 4/2016 | Garrett et al. | |

OTHER PUBLICATIONS

Ma, Xiaoyu et al., "Optimal Dynamic Pricing of Mobile Data Plans in Wireless Communications", Preprint submitted to Omega, Feb. 2, 2016, pp. 1-51.

Sen, Soumya et al., "A Survey of Smart Data Pricing: Past Proposals, Current Plans, and Future Trends", ACM Computing Surveys, vol. 46, No. 2, Article 15, Publication date: Nov. 2013. pp. 1-37.

* cited by examiner

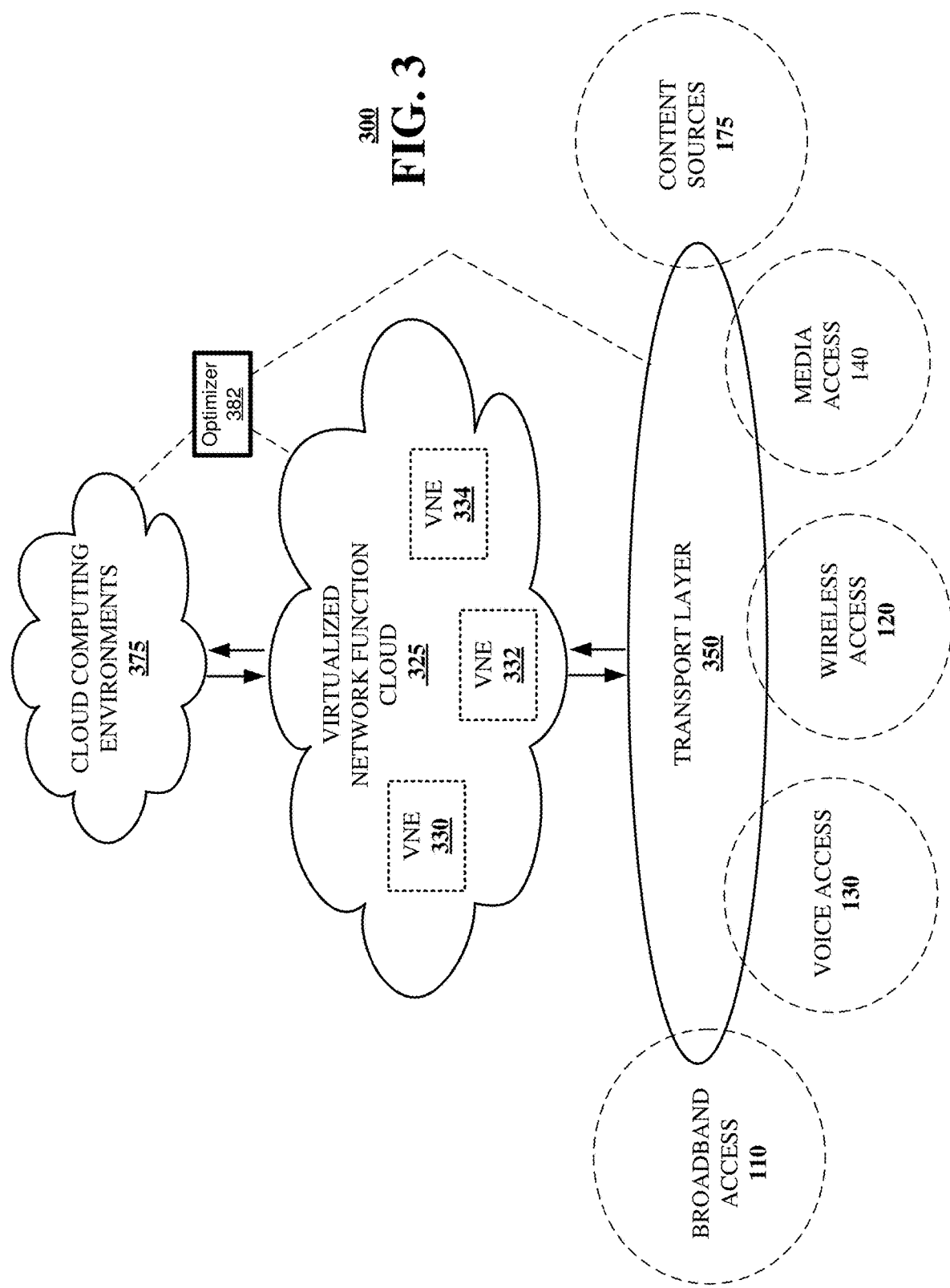

SYSTEM AND METHOD FOR OPTIMIZING REVENUE THROUGH BANDWIDTH UTILIZATION MANAGEMENT

FIELD OF THE DISCLOSURE

The subject disclosure relates to a system and method for optimizing revenue through bandwidth utilization management.

BACKGROUND

Data consumption is growing and congesting the bandwidth of Internet Service Providers (ISP). For example, wireless Internet data usage is reportedly doubling every year. It is also understood that usage of data is often concentrated during certain peak hours of the day making the bandwidth utilization inefficient. At certain times the network is over-utilized, while at other times it is under-utilized. These periods of heavy usage, sometimes referred to as "peak-hour" congestions, can dominate a cost structure of the ISPs. While peak-hour congestion drives the cost of the ISPs, the ISPs revenue is usually not directly tied to data-usage.

There are multiple ways in which ISPs can charge their customers to obtain a return on investment on their infrastructure. One option is to use a flat fee. The problem with flat fees is that the ISP's revenue does not increase proportional to the consumption of data by their users, but their cost is. For example, an ISP can offer a flat fee plan of a single charge per month for unlimited data. Another pricing mechanism is to charge based on data caps, where there is a different price associated to the maximum monthly consumption. While flat-rates encourage over-use and waste and lead to inefficient subsidies of heavy users, there is evidence that consumers of Internet-based services prefer simple flat-rate pricing schemes.

For example, an ISP can offer plans for predetermined fixed or maximum amount of data per month, e.g., a low data limit of 10 GB for a low fixed fee, e.g., $80/month, and a higher data limit of 30 GB for a higher fixed fee of $135. In this manner, revenue grows as data consumption grows.

BRIEF DESCRIPTION OF THE DRAWINGS

Reference will now be made to the accompanying drawings, which are not necessarily drawn to scale, and wherein:

FIG. 3 is a block diagram illustrating an example, non-limiting embodiment of a virtualized communication network in accordance with various aspects described herein.

DETAILED DESCRIPTION

Figure 1:
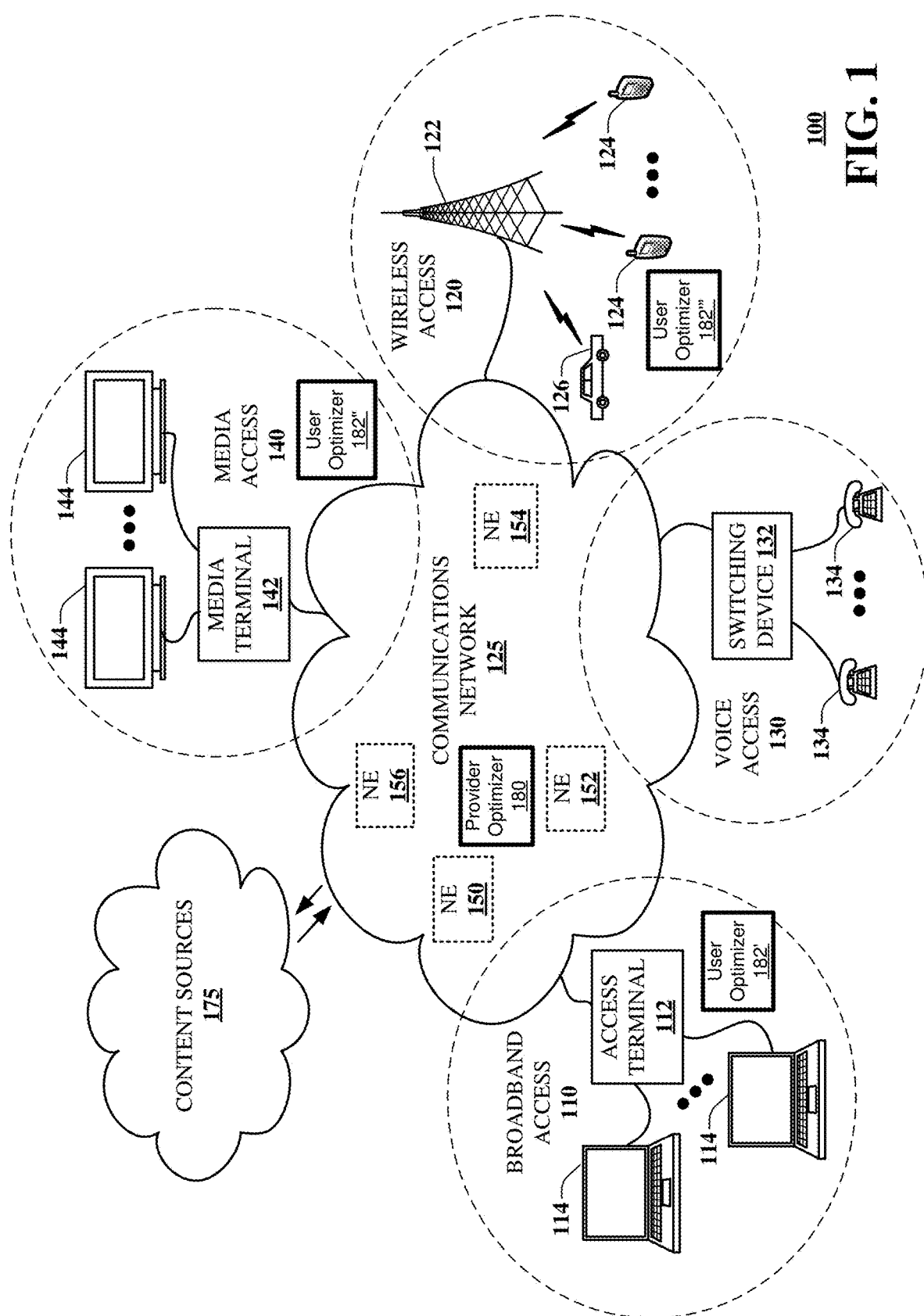
FIG. 1 is a block diagram illustrating an example, non-limiting embodiment of a communications network in accordance with various aspects described herein.

The subject disclosure describes, among other things, illustrative embodiments for efficiently transmitting and storing data, incentivizing users to consume data during non-peak hours and sharing resources to reduce bandwidth consumption, while satisfying user demand and minimizing ISP investment on infrastructure. Other embodiments are described in the subject disclosure.

One or more aspects of the subject disclosure include a device, including a processing system including a processor and a memory that stores executable instructions. The instructions, when executed by the processing system, facilitate performance of operations that include monitoring a bandwidth utilization of a network, receiving a request provided by equipment of a user to access requested network content by way of the network provided by a network service provider, and adjusting, responsive to the bandwidth utilization exceeding a threshold, a data service price to obtain an adjusted data service price for transporting the requested network content to the equipment of the user. A notification of the adjusted data service price is forwarded to the equipment of the user, and an updated request is obtained from the equipment of the user for providing the requested network content to the equipment of the user, wherein the updated request is responsive to the notification of the adjusted data service price. Transport of the requested network content to the equipment of the user is initiated according to the updated request.

One or more aspects of the subject disclosure include a non-transitory, machine-readable medium, including executable instructions. The instructions, when executed by a processing system including a processor, facilitate performance of operations, including determining a bandwidth utilization of a network, receiving a request provided by equipment of a user to access requested network content by way of the network provided by a network service provider, and adjusting, responsive to the bandwidth utilization exceeding a threshold, a data service price to obtain an adjusted data service price for transporting the requested network content to the equipment of the user. A notification of the adjusted data service price is provided to the equipment of the user, and an updated request is obtained from the equipment of the user for providing the requested network content to the equipment of the user, wherein the updated request is responsive to the notification of the adjusted data service price. Transport of the requested network content to the equipment of the user is facilitated according to the updated request.

One or more aspects of the subject disclosure include a process, that includes determining, by a processing system including a processor, a bandwidth utilization of a network, obtaining, by the processing system, a request provided by equipment of a user to access requested network content by way of the network, adjusting, by the processing system, responsive to the bandwidth utilization exceeding a threshold, a data service price to obtain an adjusted data service price for transporting the requested network content to the equipment of the user, and forwarding, by the processing system, a notification of the adjusted data service price to the equipment of the user. An updated request is obtained from the equipment of the user for providing the requested network content to the equipment of the user, wherein the updated request is responsive to the notification of the adjusted data service price. Transport of the requested network content to the equipment of the user is facilitated according to the updated request.

Referring now to FIG. 1, a block diagram is shown illustrating an example, non-limiting embodiment of a communications network 100 in accordance with various aspects described herein. For example, communications network 100 can facilitate in whole or in part opportunities to increase revenue through bandwidth utilization management. Bandwidth utilization management can include one or more of an application of dynamic pricing, local storage or caching of content using a content delivery network and/or a peer-to-peer network, e.g., including storing or otherwise caching within local caches of equipment of a user or subscriber. In particular, a communications network 125 is presented for providing broadband access 110 to a plurality of data terminals 114 via access terminal 112, wireless access 120 to a plurality of mobile devices 124 and vehicle 126 via base station or access point 122, voice access 130 to a plurality of telephony devices 134, via switching device 132 and/or media access 140 to a plurality of audio/video display devices 144 via media terminal 142. In addition, communication network 125 is coupled to one or more content sources 175 of audio, video, graphics, text and/or other media. While broadband access 110, wireless access 120, voice access 130 and media access 140 are shown separately, one or more of these forms of access can be combined to provide multiple access services to a single client device (e.g., mobile devices 124 can receive media content via media terminal 142, data terminal 114 can be provided voice access via switching device 132, and so on).

The communications network 125 includes a plurality of network elements (NE) 150, 152, 154, 156, etc., for facilitating the broadband access 110, wireless access 120, voice access 130, media access 140 and/or the distribution of content from content sources 175. The communications network 125 can include a circuit switched or packet switched network, a voice over Internet protocol (VoIP) network, Internet protocol (IP) network, a cable network, a passive or active optical network, a 4G, 5G, or higher generation wireless access network, WIMAX network, UltraWideband network, personal area network or other wireless access network, a broadcast satellite network and/or other communications network.

In various embodiments, the access terminal 112 can include a digital subscriber line access multiplexer (DSLAM), cable modem termination system (CMTS), optical line terminal (OLT) and/or other access terminal. The data terminals 114 can include personal computers, laptop computers, netbook computers, tablets or other computing devices along with digital subscriber line (DSL) modems, data over coax service interface specification (DOCSIS) modems or other cable modems, a wireless modem such as a 4G, 5G, or higher generation modem, an optical modem and/or other access devices.

In various embodiments, the base station or access point 122 can include a 4G, 5G, or higher generation base station, an access point that operates via an 802.11 standard such as 802.11n, 802.11ac or other wireless access terminal. The mobile devices 124 can include mobile phones, e-readers, tablets, phablets, wireless modems, and/or other mobile computing devices.

In various embodiments, the switching device 132 can include a private branch exchange or central office switch, a media services gateway, VoIP gateway or other gateway device and/or other switching device. The telephony devices 134 can include traditional telephones (with or without a terminal adapter), VoIP telephones and/or other telephony devices.

In various embodiments, the media terminal 142 can include a cable head-end or other TV head-end, a satellite receiver, gateway or other media terminal 142. The display devices 144 can include televisions with or without a set top box, personal computers and/or other display devices.

In various embodiments, the content sources 175 include broadcast television and radio sources, video on demand platforms and streaming video and audio services platforms, one or more content data networks, data servers, web servers and other content servers, and/or other sources of media.

In various embodiments, the communications network 125 can include wired, optical and/or wireless links and the network elements 150, 152, 154, 156, etc., can include service switching points, signal transfer points, service control points, network gateways, media distribution hubs, servers, firewalls, routers, edge devices, switches and other network nodes for routing and controlling communications traffic over wired, optical and wireless links as part of the Internet and other public networks as well as one or more private networks, for managing subscriber access, for billing and network management and for supporting other network functions.

In at least some embodiments, the communications network includes a network service provider revenue optimization engine 180. The revenue optimization engine 180 can implement one or more of the revenue enhancement or optimization techniques disclosed herein. By way of non-limiting example, the revenue enhancement engine 180 can monitor and/or estimate bandwidth utilization of one or more segments of the communications network 125, determine when the bandwidth utilization indicates periods of heavy and/or peak usage, and adjusts pricing to promote enhanced bandwidth utilization. pricing can include an increased and/or premium pricing to service requests for network content during periods of high bandwidth utilization. Such adjusted pricing, sometimes referred to as dynamic pricing, can increase revenue to servicing requests during peak utilization periods at a higher or premium price. Likewise, the adjusted pricing can increase revenue to servicing requests that are delayed or otherwise deterred by the premium pricing, during non-peak periods of usage that are not subject to the premium pricing.

Alternatively or in addition, the revenue enhancement engine 180 can facilitate an improved utilization of network bandwidth by proximally storing media content that is detected and/or estimated to be popular or otherwise in relatively high demand. Proximal storage can include one or more of a content delivery network providing storage or caching at one or more edge nodes, and/or peer-to-peer arrangements in which content can be pushed and/or otherwise downloaded, locally stored and/or cached using user equipment, wherein subsequent requests are served through the user equipment to other users. Such sharing can be coordinated through equipment of the network service provider to ensure that such subsequent downloads or sharing is provided to authorized users, e.g., subscribers of a network service provider and/or a content provider.

Alternatively or in addition, the communications network includes one or more user optimization engines 182', 182", 182''', generally 182. In some embodiments, the user optimization engines 182 participate in the servicing of request for network content. By way of non-limiting example, the user optimization engines 182 evaluate request for content in association with pricing, past data usage for a giving billing period, anticipated usage and/or content request during a given billing period, available credits, and the like. For example, when requested media content is subject to dynamic pricing that might include premium pricing, e.g., surge pricing, the user optimization engine 182 can provide a notification to equipment of the user before servicing the request to ensure that the user is willing to accept the adjusted pricing. In at least some embodiments, the user optimization engine 182, in addition to the notification of the dynamic or adjusted pricing arrangement, provides account status information of the user, e.g., available data, current charges, anticipated charges to facilitate an evaluation by the user as to whether the request should be made according to the adjusted pricing. In at least some embodiments, the user optimization engine 182 determines a recommendation as to whether the request should be made according to the adjusted pricing, delayed and/or terminated and provides the recommendation to the equipment of the user. It is envisioned that in at least some embodiments, a requesting user will be provided with a notification of adjusted pricing, along with an option to proceed, delay and/or termination the request.

Alternatively or in addition, the user optimization engine 182 can implement one or more rules responsive to a user request for content, a notification of adjusted pricing, and/or availability of other options, such as a delayed service, an alternative content item, such as version that would require less bandwidth, e.g., a smaller display size, a lower resolution, and the like, and/or an entirely different content item altogether. For example, the rules can implement logic as to whether a request should be made at an adjusted price, or whether the request should be deferred, replaced with substitute content, obtained from a different source, and the like.

Figure 2A:
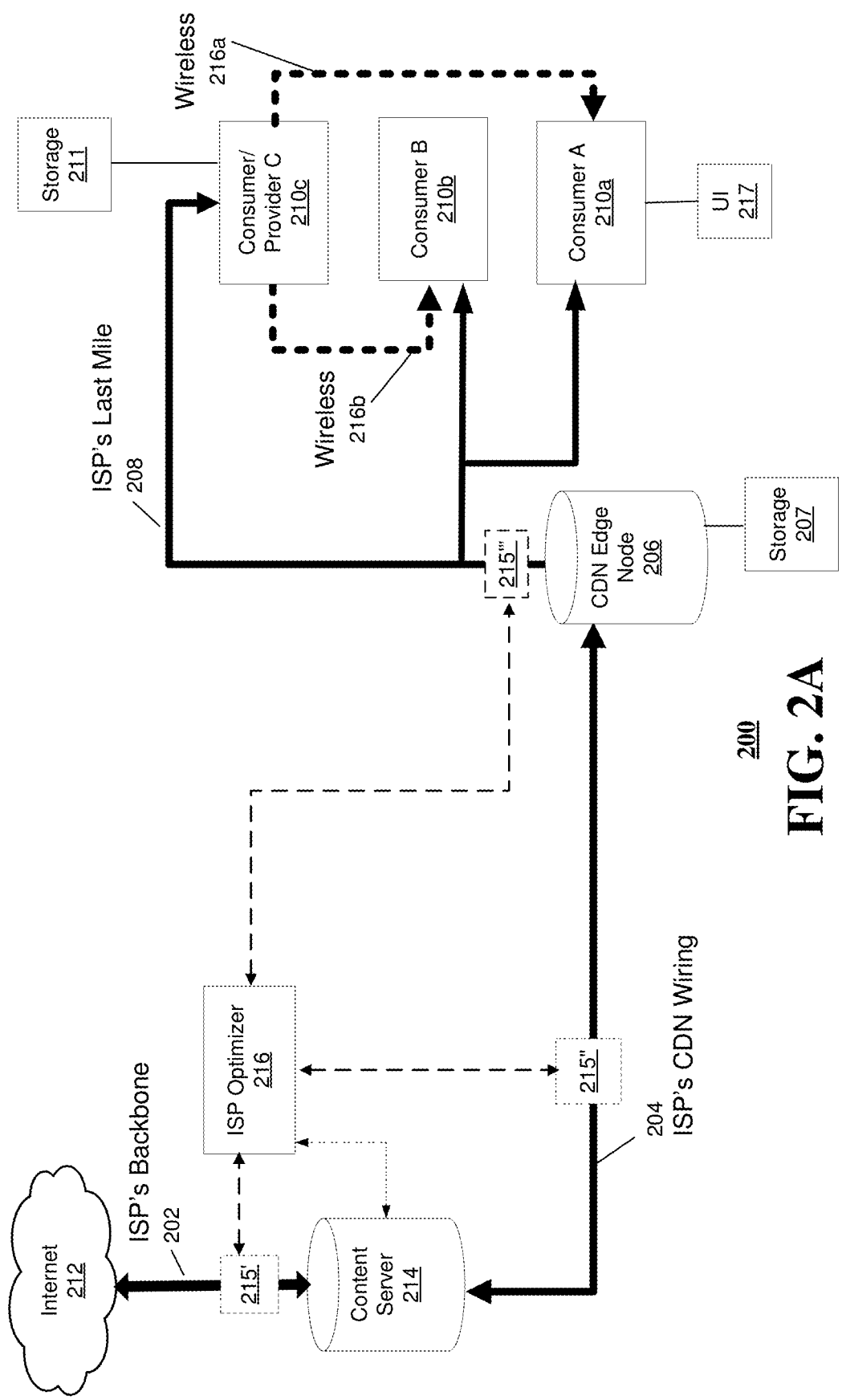
FIG. 2A is a block diagram illustrating an example, non-limiting embodiment of a dynamic data pricing, hybrid delivery network system functioning within the communication network of FIG. 1 in accordance with various aspects described herein.

FIG. 2A is a block diagram illustrating an example, non-limiting embodiment of a dynamic data pricing, hybrid delivery network system 200 functioning within the communication network of FIG. 1 in accordance with various aspects described herein. The system 200 includes an internet service provider backbone network 202, a content server 214, content delivery network 204 including one or more edge nodes 206, and so-called "last mile" network connectivity or wiring 208, e.g., between the edge nodes 206 and equipment of one or more consumers 210a, 210b, 210c, generally 210. The content server 214 receives requests for network content from the equipment of the users 210 and facilitates servicing of the requests, e.g., by identifying a source and/or repository of the requested content, and transporting the requested content to the equipment of the users 210. It is understood that the ISP network, e.g., the content server 214, is in communication with one or more external network resources, e.g., the Internet 212, and that in at least some embodiments, provides access to the requested network content.

A content delivery network 204 is used to deliver content over a network more efficiently. The content delivery network 204 can host, mirror and/or cache at least some of the content as well as deliver it to equipment of a requesting user. A web site or origin server can be linked to the content delivery network 204 such that some or all of the content can be sourced from the content delivery network 204 rather than from the content server 244, directly. In at least some embodiments, this process of fulfilling a content request through a content delivery network 204 can be transparent to the user.

In at least some embodiments, a Hybrid Content Delivery Network (CDN) and Peer-to-Peer Network (P2P) infrastructure is provided to optimize the storage and transmission of data. With the P2P network users that do not need much bandwidth at certain hours might get compensated for helping offload the network. With the CDN users might have certain content pre-fetch during non-peak hours and serve it during peak hours. Additionally, the ISP may minimize the last mile investment, given that the peers of the network have the potential to serve content utilizing wireless technologies, for example through Mobile HotSpots, WiFi or other free spectrum In at least some embodiments, the content delivery network 204 is a distributed computer systems in charge of storing, caching, transmitting and streaming data. The content delivery network 204 can be used for optimizing the delivery of content by reducing network congestion. For example, if user equipment 210 is sparsely distributed geographically and request are received from multiple user equipment 210 to stream a particular movie, it is not necessary for of all the user equipment 210 to stream the requested movie from the same (and possible far away) central location, e.g., from a remote and/or head end content server 214. Rather, a popular movie is identified and stored in various edge nodes 206, which are generally much closer to the user equipment 210. In this manner, the user equipment 210 retrieves requested content that is relatively near or proximal, avoiding congestion on other parts of the network, such as the content delivery network wiring 204 and/or the ISP backbone 202. Consequently, such distribution of popular content to the edge nodes 206 avoids network congestion.

The content delivery network 204 still represent a cost for the ISPs and it is unlikely they would be sufficient to store all of the requested content, only the "hot" content. It is understood that in at least some embodiments, the content delivery network 204 need not to be in a wired data center. For example, functions of the edge nodes 206 can be extended into the user equipment 210, e.g., a mobile phone. In at least some instances Peer-to-Peer (P2P) networks are employed to pre-store content, e.g., popular content, and to contribute to the ISP's servicing of content requests by forwarding locally stored or cached versions of the requested content to the requesting user equipment 210. Accordingly, users of the network can themselves serve content thus reducing network congestion and reducing cost for the ISP.

It is envisioned that in at least some embodiments, such participation of user equipment 210 in the servicing requests for network content by the ISP, will be rewarded by the ISP. Such rewards can include, without limitation, payment, credits, incentives, and the like.

P2P networks are computer networks used for sharing files and other things, where the participants of the network provide the computing power and bandwidth for sharing instead of a set of dedicated servers. In this setting, each node, e.g., each user equipment 210, can be considered a peer since it can act as both client and server, or a supplier and a consumer of content. P2P networks are generally implemented according to an application layer overlay network in which all entities are equal and all contribute some of their resources, thus giving rise to a network in which each entity (peer) is both a requestor and a content provider. One or more peer-to-peer connections may be configured between equipment of network users, for use in P2P communications. P2P communications can be used to transfer shared content among the equipment of the network users. Users can receive incentives for participating in P2P communications, for example, sharing credits and/or reduced charges. The P2P sharing server, e.g., operated by a network service provider, can track and/or aggregate sharing credits based on communication of shared content. In at least some embodiments, access to shared content is restricted to authorized service requests. Such authorizations can be based on one or more of subscription status, requester and/or requestor equipment authentication, and the like.

Since each peer node 210 acts as both supplier and consumer of content, computing resources and bandwidth are shared and P2P networks are flexible and can adapt to peak demand times and distribute work over peer nodes. For example, the higher the demand for a particular content, the more it will be available in the network as peers download a copy. One of the challenges with P2P networks, however, is to prevent unauthorized access, e.g., "free-riding." In at least some embodiments, this can be accomplished by providing by the IPSs, incentives to users to participate in a managed distribution of content. For example, users who upload more content than they consume get compensated.

In at least some embodiments, an ad-hoc network can be used to assist in the pre-fetching, storing and/or serving of content. Ad-hoc networks can include a self-organizing, self-healing wireless network in which mobile nodes are responsible for discovery of each other and subsequent cooperation so that communication is possible. In at least some embodiments, management of serving request for network content by the ad-hoc networks can be coordinated by the ISP.

It is generally understood that P2P and ad-hoc network have some commonalities and some differences. They both have decentralized architectures, e.g., no master, transient connectivity, e.g., links are not stable in time or space, heterogeneity and/or resources, e.g., the resources available to nodes are not necessarily equal. On the other hand, some of differences include size, ad-hoc networks are usually limited to a few hundred nodes whereas P2P networks can scale, without restriction, e.g., being capable of up to several million of peers. Other differences can include the OSI layer at which the P2P and ad hoc networks operate. For example, P2P typically focuses on one or more upper layers, such as application layer, presentation layer and session layer, whereas, ad-hoc networks typically focus on one or more lower layers, such as Network layer, Data-link layer, and Physical layer.

In the illustrative example, user equipment 210*c* is engaged in a P2P with user equipment 210*a*, 210*b*. According to the example, a consumer/provider C stores pre-fetched content locally at storage resource 211. The storage resource 211 can include local storage, such as a local hard disk drive, local memory, locally networked storage, e.g., accessible by a local network, such as an Ethernet connection and/or IEEE 802.3 wireless connection. According to the illustrative example, the user equipment 210*c* communicates with the ISP through the ISP's last mile 208 and with one or more of the other user equipment 210*a*, 210*b* through a wireless network 216*a*, 216*b*, generally 216. Wireless networks can include, without limitation, any of the various wireless technologies disclosed herein or otherwise generally known, e.g., including IEEE 802.3 wireless technologies, such as WiFi, BlueTooth, and the like.

Although wireless networks 216 are illustrated, it is envisioned that in at least some instances, the consumer/provider C equipment 210*c* can be in a wired connectivity and/or a combination of wired and wireless connectivity with one or more of the other requesting user equipment 210*a*, 210*b*. Wired technologies can include any of the various wired technologies disclosed herein or otherwise known, including Ethernet, AppleTalk, and the like. In at least some instances the P2P technologies can include dedicated wiring and/or communication networks, such as radio networks, e.g., packet radio, satellite, hard-wired, circuit switched, e.g., plain old telephone service, and the like.

Hybrid networks that use CDNs and P2P, such as the illustrative example network 200, have also been used to optimize the delivery of content and minimize network congestion. In such a setting, one or more peer machines 210 associate themselves with the CDN 204 and content can be served from a peer 210*c*, from a CDN server, e.g., edge node 206, or from both depending on traffic and load conditions.

The illustrative example network 200 includes an ISP optimizing engine 216 in communication with one or more network monitors 215', 215", 215''', generally 215. The network monitors 215 monitor one or more of network traffic, bandwidth utilization, network conditions, e.g., delays, error performance, and the like. In some embodiments, the ISP optimizing engine 216 can be configured to determine and/or otherwise manage implementation of a dynamic pricing. The dynamic pricing, including any of the price adjusting techniques disclosed herein, or equivalents, can be based on one or more of the monitored quantities. Alternatively or in addition, the dynamic pricing is also determined according to received and/or anticipated requests for network content.

According to dynamic pricing, price adjustments are used to incentivize users to spread their bandwidth consumption across different times of the day. Such incentives can have a large impact on the ISP revenue, network congestion and customer behavior. In at least some embodiments, requesting users are provided with a user interface 217, e.g., by the user equipment, to report pricing adjustments, e.g., reporting a busy condition or surge, and to allow the user to approve surge pricing or otherwise manage a request. For example, a user may choose to defer the request to another time not subject to surge pricing. Alternatively or in addition, the user may choose to substitute the request with another request, e.g., requiring less data, as in a lower resolution video and/or audio, a smaller sized picture and/or video, or some other version, such as a text only version of a news story, without photos or video.

In at least some embodiments, the optimization of the pricing from the ISP perspective depends on one or more of a time elasticity of the users and a cost associated with exceeding the network capacity, e.g., network failure, increased errors, reduction in quality, lost opportunities for contemporaneously serviced requests and so on. In at least some embodiments, dynamic pricing is reactive to network congestion, e.g., based on heuristics as applied to voice traffic. It is appreciated, however, that voice traffic is very different than data traffic (e.g., file backup, movie downloads). Accordingly dynamic pricing includes other considerations, e.g., selecting a granularity of a time period use for dynamic pricing. Time periods can be set at hours, minutes and/or seconds.

In general, dynamic pricing can be used to provide the users with a choice of when to fetch data to minimize their bill. Dynamic pricing can also be used to incentivize users to consume less or not consume during peak-hours. Alternatively or in addition, dynamic pricing can be used to incentivize users to share content during peak-hours.

Dynamic pricing can be utilized to incentivize consumers to reduce their data consumption during peak hours whenever possible. The dynamic pricing can be used to increase or otherwise maximize revenue of an ISP and may be further used to minimize the cost for the consumer. For example, there could be a base cost of US $1 per MB and during peak hours the surge price kick-in and the cost to the user is two times the base price. Dynamic pricing is implemented such that supply and demand are as close to each other as possible. For example, surge pricing is used to ensure that network request are serviced where and when they are most needed. A market price being an indicator in at least some instances. An ISP can set up a base price and depending on the supply of bandwidth, time of the day, location and demand from other network users, the base price increases. By increasing the price, only the persons willing to pay the extra fees will download content and because the price is higher, requesting users are incentivized to adjust their requests to other locations and/or times at which demand (content requests) does not exceed supply (bandwidth). Consuming users are notified of the increase in price through the user interface 217.

Accordingly, dynamic pricing is an important tool for incentivizing users to spread their bandwidth consumption and to ensure that when demand exceeds supply, only the people that are really capable and willing to pay, receive service. However, providing the right incentives is just part of the solution. By utilizing content delivery networks, the P2P networks, and combinations thereof, the most important or "hot" content can be cached in multiple locations near the users to avoid congesting the network.

Figure 2B:
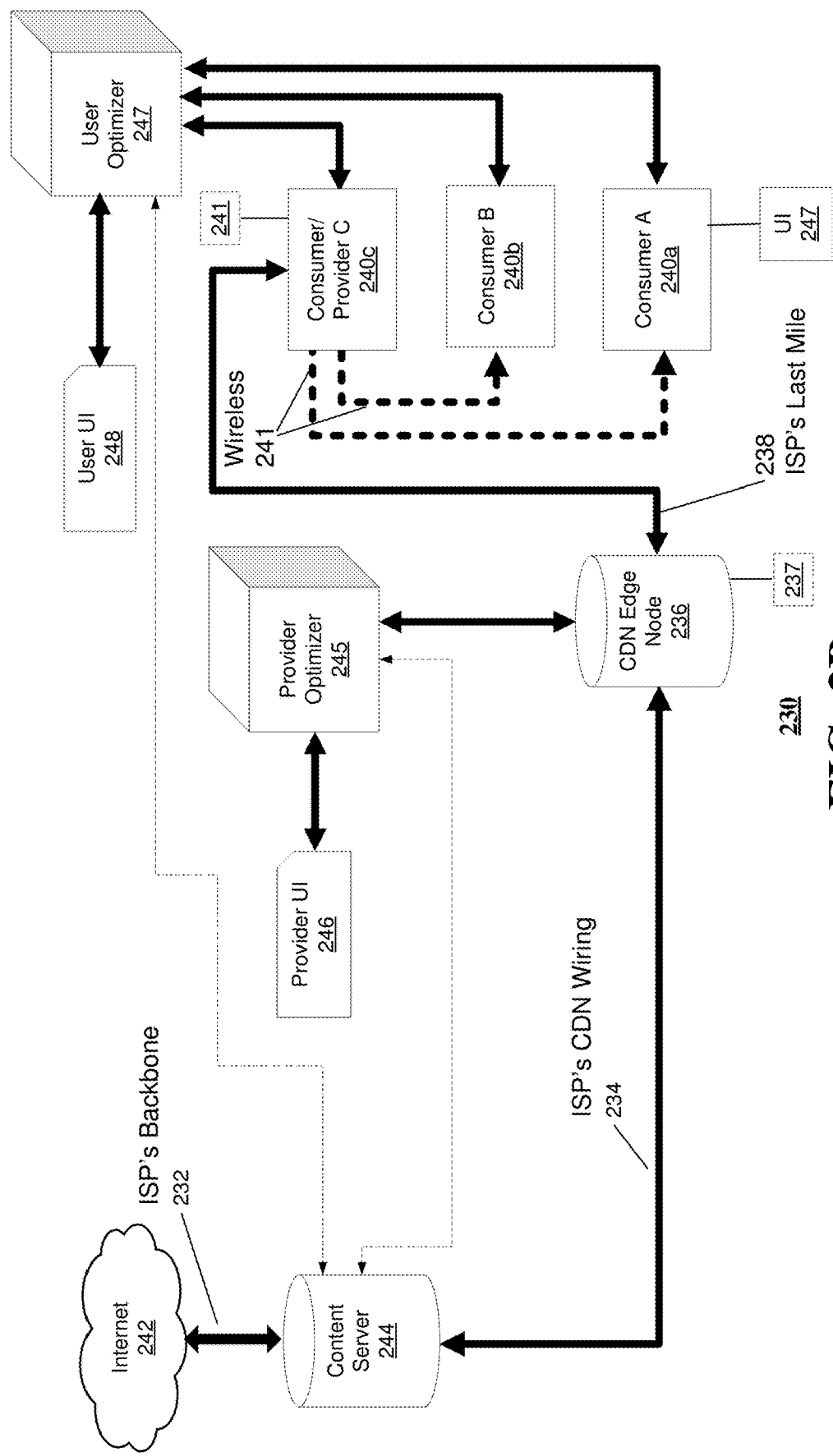
FIG. 2B is a block diagram illustrating an example, non-limiting embodiment of another dynamic data pricing, hybrid delivery network system functioning within the communication network of FIG. 1 in accordance with various aspects described herein.

FIG. 2B is a block diagram illustrating an example, non-limiting embodiment of another dynamic data pricing, hybrid delivery network system 230 functioning within the communication network of FIG. 1 in accordance with various aspects described herein.

The system 230 includes an internet service provider backbone network 232, a content server 244, content delivery network 234 including one or more edge nodes 236, and so-called "last mile" network connectivity or wiring 238, e.g., between the edge nodes 236 and equipment of one or more consumers 240a, 240b, 240c, generally 240. The content server 244 receives requests for network content from the equipment of the users 240 and facilitates servicing of the requests, e.g., by identifying a source and/or repository of the requested content, and transporting the requested content to the equipment of the users 240. It is understood that the ISP network, e.g., the content server 244, is in communication with one or more external network resources, e.g., the Internet 242, and that in at least some embodiments, provides access to the requested network content.

In at least some embodiments, the content delivery network 234 is a distributed computer systems in charge of storing, caching, transmitting and streaming data. The content delivery network 234 can be used for optimizing the delivery of content by reducing network congestion. For example, if user equipment 240 is sparsely distributed geographically and request are received from multiple user equipment 240 to stream a particular movie, it is not necessary for of all the user equipment 240 to stream the requested movie from the same (and possible far away) central location, e.g., from a remote and/or head end content server 244. Rather, a popular movie is identified and stored in various edge nodes 236, which are generally much closer to the user equipment 240. In this manner, the user equipment 240 retrieves requested content that is relatively near or proximal, avoiding congestion on other parts of the network, such as the content delivery network wiring 234 and/or the ISP backbone 232. Consequently, such distribution of popular content to the edge nodes 236 avoids network congestion.

In at least some embodiments, the content delivery network 234 puts and removes certain "hot" content as close as possible to the users to minimize overall bandwidth consumption. By way of example, one or more algorithms can be implemented by the content delivery network 234, 236, such as any of generally known standard caching algorithms, their variations or cost-based caching algorithms (e.g., Least Frequently used, or LFU, Size, Least Recently Used or LRU-threshold, Log(size)+LRU, Hyper-G, Pitkow, Lowest-latency-first, hybrid, Lowest Relative Value or LRV), and the figure of metric may be number of hits, number of bytes, time or bandwidth The content delivery network 234, the P2P and/or a hybrid of both networks allows users to serve as both consumers and servers of data. In particular, the P2P network reduces or otherwise minimizes the ISPs cost by using infrastructure from the peers of the network (e.g. storage, bandwidth, computing).

Utilizing P2P can significantly reduce an ISPs investment in last mile, since WiFi, Mobile Hot-Spots, 5G and/or other free spectrum might be used for sharing. Essentially, the peers of the network would be providing their own "pipes". It could also be possible for the ISP to have shorter deployment times and deploy in other-wise impossible locations, given that the permits required for laying cables is minimized In the illustrative example, user equipment 240c is engaged in a P2P with user equipment 240a, 240b. According to the example, a consumer/provider C stores pre-fetched content locally at storage resource 241. The storage resource 241 can include local storage, such as a local hard disk drive, local memory, locally networked storage, e.g., accessible by a local network, such as an Ethernet connection and/or IEEE 802.3, 802.11 wireless connection. According to the illustrative example, the user equipment 240c communicates with the ISP through the ISP's last mile 208 and with one or more of the other user equipment 240a, 240b through a wireless network 241a, 241b, generally 241. Wireless networks can include, without limitation, any of the various wireless technologies disclosed herein or otherwise generally known, e.g., including IEEE 802.1 wireless technologies, such as WiFi, BlueTooth, and the like.

The illustrative example network 230 includes an ISP optimizing engine 245 in communication with an ISP provider user interface 246. In at least some embodiments, the provider user interface 246 allows a provider to configure and monitor the user optimizer 247. For example, the provider user interface 246, allows a provider to configure the incentives, monitor network consumption, revenue, cost, income, adjust prices, set default configurations and automate tasks. In general, the ISP optimizing engine 245 can determine a proper price surge to increase, and in at least some instances, maximize total revenue, while serving as many customers as possible based partially on the supply and demand of bandwidth per location per time. In some embodiments, the ISP optimizing engine 245 can be configured to determine and/or otherwise manage implementation of dynamic pricing, e.g., via the ISP provider user interface 246. More generally, the user interface 246 allows users to configure their maximum allowed charge, monitor consumption, cost, income, receive notifications, set default configurations and automate tasks. For example, the interface might ask the user to confirm if he/she wants to stream a movie right now or if he/she wants to defer the consumption for an hour to minimize the cost. The ISP optimizing engine 245 allows the ISP to configure their revenue and to determine the surge price that depends partially on bandwidth availability, location, time, CDN capacity and number of peers available. Alternatively or in addition, the ISP optimizing engine 245 determines how much to compensate peers that share content.

The illustrative example network 230 further includes user optimizing engine 247 in communication with a user interface 248. In at least some embodiments, the user interface 248 allows a user to configure and monitor the user optimizer 247. In some embodiments, the user optimizing engine 247 can be configured to provide user notification of surge pricing and/or to otherwise manage requests in view of dynamic pricing imposed by the ISP. In at least some embodiments the dynamic pricing applied by the user optimizing engine 247 provides automatic configuration of usage and charges expectations (e.g., the user sets a maximum monthly charge he/she is willing to pay and does not receive notifications with respect to surge pricing). In at least some embodiments, the user optimizer 247 provides a bill optimizing function for the user, which determines preferred settings given the prices of the ISP and pre-fetches content when needed to avoid consuming bandwidth during peak-hours. For example, the user might decide to confirm via the user interface every time he/she wants to stream a movie or the user can enable the optimizer and just streaming without having to confirm every time. The optimizer would take into account settings such as maximum allowed expenses per month.

As illustrated, one or more of the ISP optimizing engine 245 and the user optimizing engine 247 are in communication with equipment of the ISP, such as the content server 244. For example, in at least some embodiments, user requests for network content can be managed through the user optimizing engine 247. Namely, a request from the user equipment 210 is received at the user optimizing engine 247, optionally pre-processed, and forwarded to the content server 244 in its original version and/or according to results of pre-processing. Pre-processing can include, without limitation, one or more of evaluation of a data size associated with the request, comparison of a determined data size with a user's data limits, if any, account balance, overage charge, and the like. To the extent an estimated size and/or cost of a request is determined, it can be provided to the user, e.g., via the user interface 248, together with a request for confirmation. Upon receiving confirmation, e.g., via the user interface 248, the request is forwarded. However, in some instances the request can be adjusted during the preprocessing phase, e.g., to defer in time, to modify requested content, e.g., to a smaller and/or less costly version, and the like.

In at least some embodiments, the user optimizer 245 allows users to manage network content requests to reduce, manage, or otherwise minimize their cost. Alternatively or in addition, the user optimizer 245 allows users to increase, manage or otherwise maximize revenue based at least partially on their cost preference, available storage and bandwidth capacity and cacheable content. Managed functions include imposing logic to facilitate implementation of rules and/or policies, e.g., to impose not to exceed costs, to manage costs per family member of a family plan, to manage cost and/or requests per device of a group of devices from among which network content can be requested, and the like.

Figure 2C:
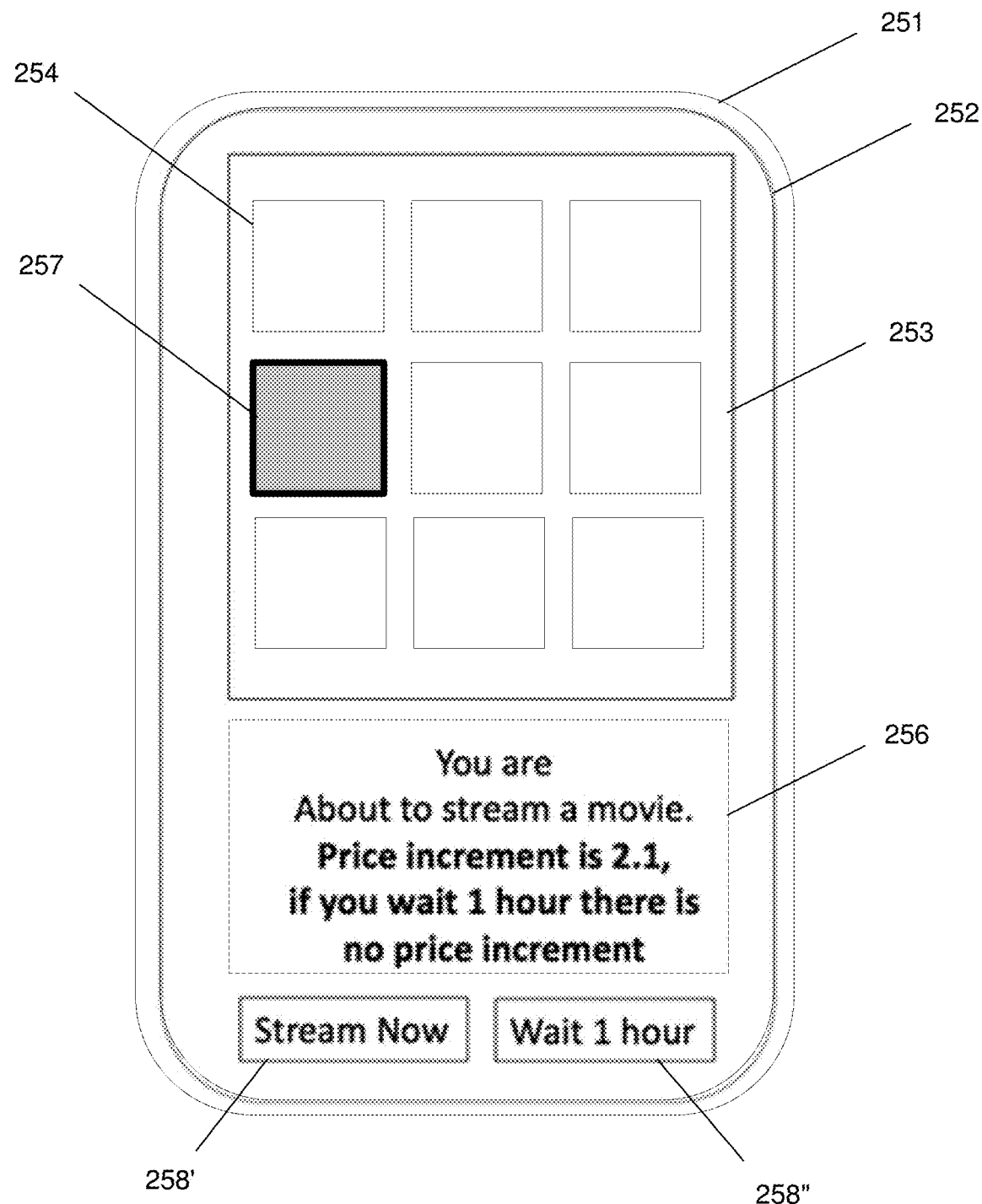
FIG. 2C is a block diagram illustrating an example, non-limiting embodiment of a user interface system functioning within the communication network of FIGS. 1, 2A and 2B in accordance with various aspects described herein.

FIG. 2C is a block diagram illustrating an example, non-limiting embodiment of a user interface system 250 functioning within the communication network of FIGS. 1, 2A and 2B in accordance with various aspects described herein. According to the illustrative example, a user device, such as a smart phone, a tablet device, a laptop computer and the like includes a display surface 252. The display surface 252, according to the user interface 250, can be configured to display a first region 253 that facilitates user selection of a content item. For example, the first region 253 can display text and/or icons, such as logos, graphics and/or an array of thumbnails 254. A user can select one of the icons 257 as in indicator of requested content. For example, the selected icon 257 can be highlighted or otherwise modified to distinguish it as being selected from the array of thumbnails 254.

In at least some embodiments, selection of the icon 257, e.g., using a touch display and/or other suitable pointing device, and or via a textual and/or audible input, initiates generation of a request. The request can be processed according to any of the illustrative techniques disclosed herein, e.g., according to pre-processing by the user optimizer 247 (FIG. 2B) and/or by one or more of the content server 244 and the ISP optimizing engine 245 (FIG. 2B).

In at least some embodiments, the display surface 252, according to the user interface 250, can be configured to display a second region 256 that facilitates presentation of information related to the user selection of the content item. Without limitation, this can include a simple confirmation of the user selection, e.g., by an operating system and/or client application running on the user device 251 and/or a message from one or more of the user optimizer 247, the content server 244, and the ISP optimizing engine 245. In at least some embodiments, the message conveys information indicating a determining of a pricing adjustment, e.g., a surge, peak and/or premium pricing. In the illustrative example, the second region 256 displays a text message indicating that the user is about to stream a movie (the selected content) have a pricing that is a multiple, e.g., 2.1 time a standard or base price.

In at least some embodiments, the second region displays a text message indicating additional pricing information, here, in the form of an option. Namely, the user is presented with an option to stream the selected movie now at the increased price, or wait for a predetermined period of time, e.g., 1 hour, to stream the same movie at the standard or base price. According to dynamic pricing, or more of the increased price and the option to defer serving the requested item are determined according to logic implemented on the ISP equipment, such as in the ISP optimizing engine 245 (FIG. 2B).

To the extent that a user is presented with one or more options, including an option to decline or otherwise cancel a request, the user interface 250 includes one or more user selectable items. According to the illustrative example, the user is presented with two selectable buttons, a first button 258' for initiating streaming of the requested content, here, according to the surge pricing, and a second button 258", here, for deferring a recommended period of 1 hour. The deferral period can be determined by the ISP, e.g., according to anticipated network conditions being less congested, namely less bandwidth utilization, at the proposed time. Alternatively or in addition, the delay period can be used to transfer the content item during momentary periods at which the bandwidth utilization may be relatively low. In this manner, buffering of a streaming movie may begin on the user equipment, and/or at another location, such as at an edge node of a content delivery network and/or at equipment of a peer user, such that the requested item would be available in a suitable capacity for consumption by the user at the deferred time.

By way of an illustrative dynamic pricing scenario, a user, Mario, is a new grad student and whenever he is not too busy, he likes to stream a lot of video, play online, and have video conferencing with his parents that leave far away. All these activities consume a lot of bandwidth. Currently, Mario is subscribed to an ISP plan that provides 16 GB of data for $90. However, every now and then Mario exceeds this maximum quota and the ISP charges him $10 more for exceeding 50 GB. Mario has not switch to the plan of 25 GB for $110 since most months he consumes less than his current maximum. Consequently, Mario is inefficiently paying, since in some months he exceeds capacity and in others he is using less than his maximum allowed.

Moreover, many of the series that Mario watches, are the same his neighbors are watching. It would not be surprising to know that usually Mario and his neighbors stream the content around the same time, they all finish classes at 9:00 pm, so there is a peak around 9:30 for bandwidth, when many students experience delays on their connection. For example, the movies start buffering a lot affecting the quality of service. To the extent that Mario could serve the series he watches to his neighbors, they would not need to stream the content from a (far away) server and congest all the network pipes. Instead, they would just stream it from Mario. In such a scenario, Mario might need to get compensated for allowing others to stream from him and his ISP would also need to know and charge the customers streaming from Mario. It's a win-win situation, Mario could make some extra money for serving content, the ISP has a less congested network and the customers do not experience that many problems with the network.

In at least some embodiments, part of the CDN infrastructure of the ISPs being completely dependent on users like Mario, serving content for a fee. For example, people with resources may buy multiple computers to serve content, to off-load the network and make some profit. The content could also be served from their mobile phones. By utilizing the peers of the network, ISPs also have the potential to minimize their investment on infrastructure, especially the costly last mile investment. For example, through the use of free wireless spectrum, Mario could act as a last mile "pipe" to serve content and/or provide connectivity. In a way similar to people buying hardware to mine bit coins, Mario could decide to invest some money and buy antennas and/or routers to provide better service to his community, potentially for a fee and with the agreement of the ISP.

It is also worth noticing that some of the content that Mario and his friends stream at the same time, is also available at a prior time. For example, multiple neighbors watch the same chapter of the Netflix series "Narcos" the same day. If so many neighbors are watching the same chapter of the same series the same day, there may be an advantage to pre-fetch the content. As soon as the chapter gets released, let say around 9 am, it would be transferred and stored at Mario's servers. That way, Mario and his neighbors would not consume bandwidth during peak hours. To make Mario and his friends consume as little bandwidth as possible during peak-hours and to make them share content during peak hours we need the right incentives. That's when dynamic pricing comes in, acting as a tool to ensure that supply and demand are close to each other as possible.

Continuing with the illustrative dynamic pricing scenario, Mario, could pay a flat fee, e.g., $5 per GB, and during peak hours, a multiplier would be added to the flat fee, that depends partially on the number of other people consuming bandwidth. For example, at 9:00 pm, the multiplier might be 1.5 based on then current network conditions, so Mario would pay $7.5 per GB whereas at 9:30 pm, the multiplier might be 2 based on then current network conditions, so Mario would pay $10 per GB. With dynamic pricing, a couple of things change. First, Mario's bill is usage-based so he would not be paying for bytes he does not use. Second, he now has the choice of selecting when to stream, since streaming has different prices during the day. He could defer his streaming for 2 hours, to off-load the network. Additionally, Mario could decide to store in a cache some of the content earlier and then sharing it with his neighbors at any time, and particularly for a fee at peak-hours.

Figure 2D:
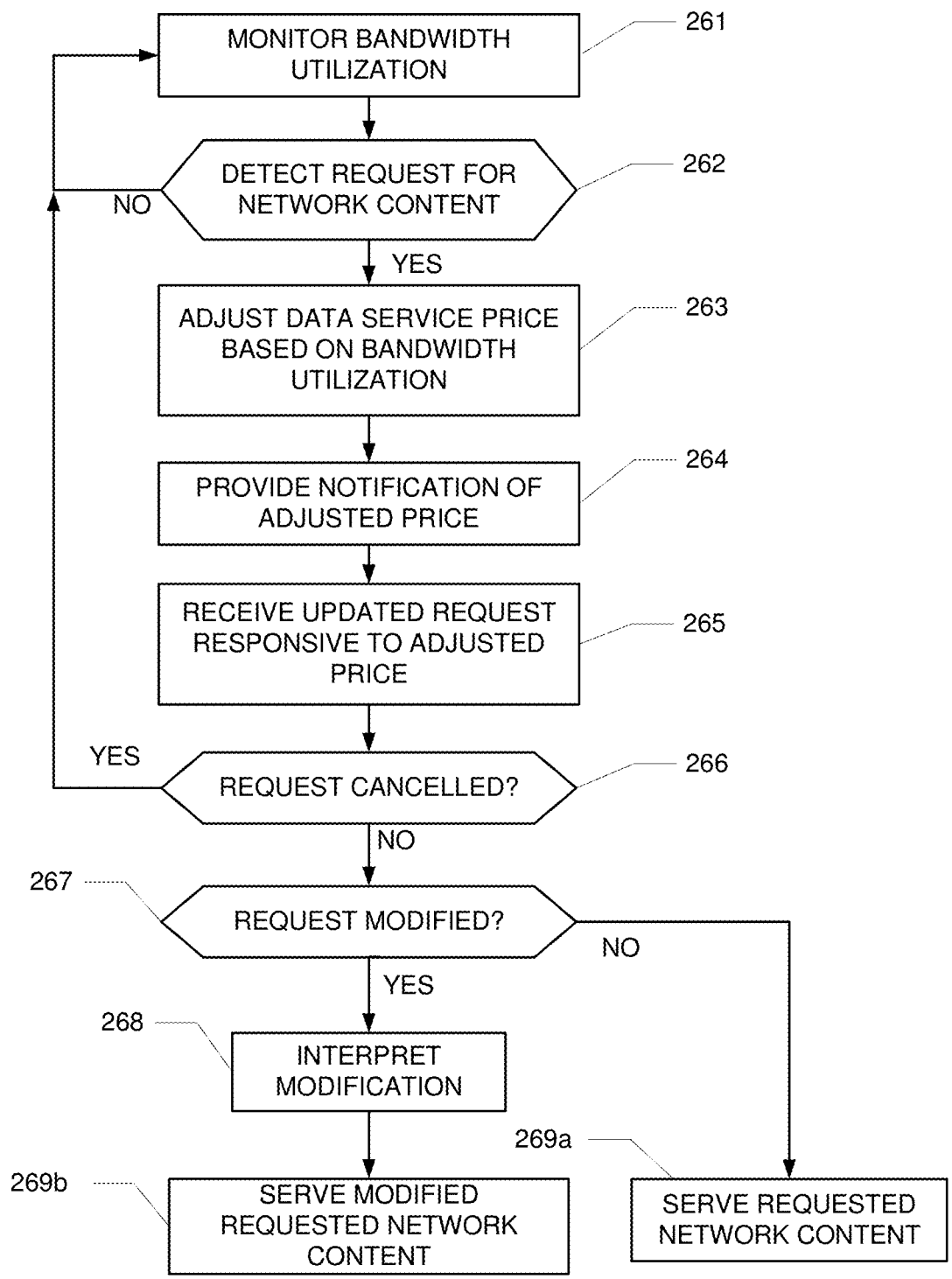
FIG. 2D depicts an illustrative embodiment of a dynamic data pricing, hybrid delivery network configuration process in accordance with various aspects described herein.

FIG. 2D depicts an illustrative embodiment of a dynamic data pricing, hybrid delivery network configuration process 260 in accordance with various aspects described herein. Bandwidth utilization is monitored at 261. This can include monitoring one or more of an entire network, a portion of a network, e.g., a region and/or a technology, a particular network path, e.g., a path including at least one of the content source and the requesting equipment and so on. Bandwidth utilization can include any suitable metric or indicator of network status, such as bandwidth usage, bandwidth capacity, channel availability, congestion, delay, quality of service, error rates, maintenance status, and the like.

A request for network content is detected at 262. The request can be initiated or otherwise obtained via user equipment, e.g., by a user selection at the user interface 250 (FIG. 2C). Detection of the request can be accomplished by equipment of ISP, e.g., at the content request server 244 (FIG. 2B). To the extent a request for network content is not detected, monitoring continues at 261. To the extent that a request for network content is detected, a service price is adjusted based on bandwidth utilization at 263.

To the extent that the price is adjusted at 263, a notification of a price adjustment is provided to equipment of a requesting user at 364. It is envisioned that the user will be presented with an indication of a new price, e.g., a multiplier applied during peak usage, sometimes referred to as surge pricing. In such instances the user can be presented with an option to continue, delay and/or defer the request.

In at least some embodiments, selection of a presented option by the user generates an updated request. The updated request can indicate whether the user has chosen to continue according to the adjusted price, to defer to a later time not subject to the adjusted price, and/or some other modification, including cancellation of the request. The updated request subject to the adjusted price is received at 265.

A determination is made at 265 as to whether the initial request was canceled. To the extent it was not cancelled, the process 260 continues from monitoring bandwidth utilization again at 261. To the extent the request was not cancelled, a further determination is made at 267 as to whether the request was modified. To the extent that the original request was not modified, the original request is serviced at 269a. Namely, the originally requested network content item is provided to the equipment of the user according to the adjusted price.

To the extent that the request was modified at 267, the modification is interpreted at 268. Interpretation can include any suitable means of interpreting a response from the equipment of the user, such as identification of a button selected on a user interface, interpretation of a textual command, an audible command, and the like. Modifications can include, without limitation, any of the example modifications disclosed herein, such as deferral of a servicing of the request to a later time that would not be subjected to the adjusted pricing, servicing of the request from alternative source, e.g., according to an edge node of the content delivery network and/or via the P2P network. Alternatively or in addition, modifications can include selection of a similar item, e.g., a lower resolution version, a smaller version, an edited and/or abridged version, any other suitable substitute, e.g., that may result in a lower charge to the user, and the like.

The suitably interpreted modified request is serviced in an appropriate manner at 269b. It is envisioned that the ISP equipment can track delayed requests, such that they are serviced at the appropriate delayed time.

Figure 2E:
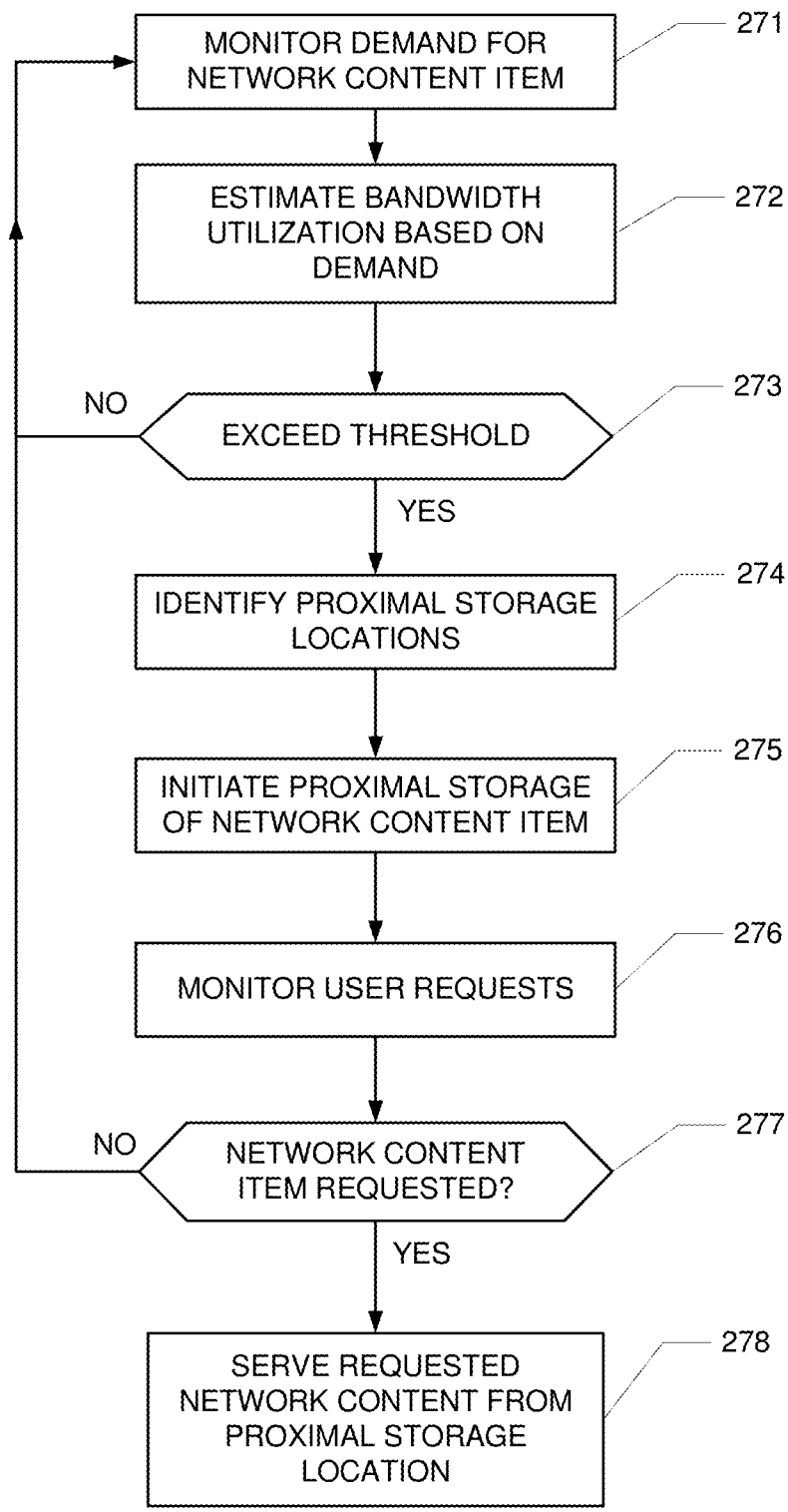
FIG. 2E depicts an illustrative embodiment of a consumer-optimization process in accordance with various aspects described herein.

FIG. 2E depicts an illustrative embodiment of a consumer-optimization process 280 in accordance with various aspects described herein. Demand for a network content item is monitored at 271. An estimation of bandwidth utilization based on demand is obtained at 272. Estimation of the bandwidth utilization can be accomplished according to any of the techniques disclosed herein or otherwise known, including actual measurements, estimates, and combinations thereof.

A determination as to whether the estimated bandwidth utilization exceeds a threshold is determined at 273. To the extent that the estimated bandwidth utilization does not exceed the threshold, the process 270 continues again from monitoring demand for network content item at 271.

To the extent that that it is determined at 273 that the estimated bandwidth does meet or exceed the threshold, alternative, e.g., proximal, storage locations are identified at 274. The proximal storage locations can include one or more of edge nodes of a content delivery network and/or user equipment of a P2P network adapted to store and serve requests.

Having identified one or more proximal storage locations, storage of the network content item is initiated at 275. It is understood that in some instances, identification of one or more of the network content item and the proximal storage locations are based on a request received from user equipment. Proximal can include geographically close, and/or closeness according to a network topology. Alternatively or in addition, identification of one or more of the network content item and the proximal storage locations can be based on past requests, anticipated requests, compensation and/or direction received from a content provider, and so on. For example, a content provider, such Netflix, may identify content, e.g., perceived or otherwise known to be popular or in demand, and can request that an ISP initiate a pre-seeding of the edge network and/or P2P network in anticipation of demand. In at least some embodiments, the content provider can pay an ISP and/or a P2P provider for such pre-seeding.

Having pre-seeded certain network content items, the process 270 continues by monitoring request for network content items at 276. To the extent that a request for the network content is not detected at 277, the process 270 continues from 271, once again monitoring demand for the network content item. However, to the extent that a request for the network content is detected at 277, the request is serviced from one or more of the proximal storage locations at 278.

Figure 2F:
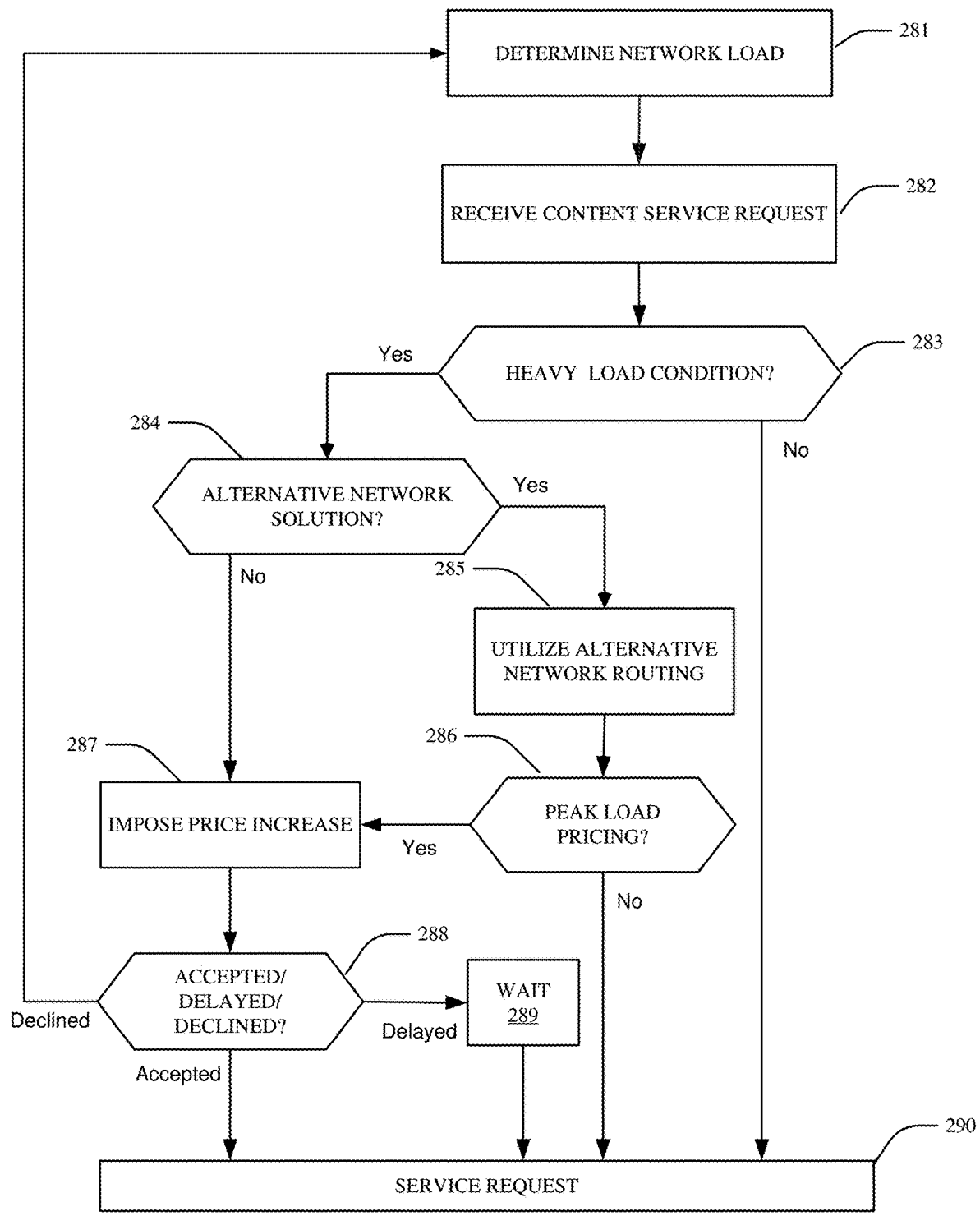
FIG. 2F depicts an illustrative embodiment of a provider-optimization process in accordance with various aspects described herein.

FIG. 2F depicts an illustrative embodiment of a provider-optimization process 290 in accordance with various aspects described herein. A network load condition is determined at 281. A content service request is received, detected or otherwise identified at 282. A determination is made at 283 as to whether the network load indicates a heavy load condition. To the extent that it is determined that the network is not under heavy load conditions, the received content service request is serviced at 290 by facilitating transport of a requested network content item to equipment of the requesting user.

To the extent that it is determined at 283 that the network is under heavy load conditions, a further determination as to whether alternative network solutions are available is determined at 284. By way of non-limiting example, alternative network solutions can include servicing the request form one or more of an edge node of a content delivery network, peer user equipment of a P2P network, or some other storage location, subject to a new network load condition, e.g., avoiding one or more congested portions of an ISP network.

To the extent it is determined at 284 that an alternative network solution is available, the alternative network solution is utilized in servicing the requested network content item to the equipment of the requesting user at 285. This can include using one or more of the content delivery network and any suitably configured P2P user equipment. Given that the alternative network solution is being used, a further determination can be made at 286 as to whether peak load pricing should be applied. Generally, the alternate solutions will avoid peak pricing. However, in least some instances, and premium or otherwise adjusted price can be applied, e.g., to offset use of the content delivery network, which may be provided by a third party, e.g., under a licensing arrangement, and/or to compensate and/or otherwise offset compensation extended to P2P participants for use of their infrastructure, bandwidth, and the like.

To the extent it is determined that peak load pricing is applied, understanding that the peak load pricing of the alternative network routing may be different, e.g., less, than peak load pricing of an unassisted ISP network may be different, the peak load pricing is imposed at 287. Likewise, to the extent it is determined at 284 that an alternative network solution is not available, a price increase is imposed at 287. The price increase can be determined according to any of the illustrative dynamic pricing techniques disclosed herein or otherwise generally known. In at least some embodiments, the imposed price increase are presented to equipment of a user, such that a user is extend an opportunity to accept or otherwise modify the initial request.

Having imposed a price increase at 287, the process 280 continues by presenting a notification to equipment of a user that the request can be accepted, delayed and/or otherwise declined. A determination is made at 288 as to whether the equipment of the user has chosen to accept, delay or decline the original request subject to the imposed price increase. To the extent that the imposed price increase is declined, the process 280 continues once again from the step of determining a network load condition at 281. To the extent that the imposed price increase is accepted at 288, the process 280 continues by servicing the request at 290. Likewise, to the extent it determined at 288 that the user has chosen to delay servicing of the request, the process imposes a suitable wait period at 289, followed by a servicing of the request at 280 after expiration of the applicable delay or wait period.

While for purposes of simplicity of explanation, the respective processes are shown and described as a series of blocks in FIGS. 2D, 2E and 2F, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

Referring now to FIG. 3, a block diagram is shown illustrating an example, non-limiting embodiment of a virtualized communication network 300 in accordance with various aspects described herein. In particular a virtualized communication network is presented that can be used to implement some or all of the subsystems and functions of communication network 100, the subsystems and functions of systems 200, 230, 250 and processes 260, 270, 280 presented in FIGS. 1, 2A, 2B, 2C, 2D, 2E, 2F and 3. For example, virtualized communication network 300 can facilitate in whole or in part one or more of dynamic pricing, storing at least some content, such as popular content at edge nodes of a content delivery network and/or pre-fetching and/or serving request for network content using P2P network techniques.

In particular, a cloud networking architecture is shown that leverages cloud technologies and supports rapid innovation and scalability via a transport layer 350, a virtualized network function cloud 325 and/or one or more cloud computing environments 375. In various embodiments, this cloud networking architecture is an open architecture that leverages application programming interfaces (APIs); reduces complexity from services and operations; supports more nimble business models; and rapidly and seamlessly scales to meet evolving customer requirements including traffic growth, diversity of traffic types, and diversity of performance and reliability expectations.

In contrast to traditional network elements—which are typically integrated to perform a single function, the virtualized communication network employs virtual network elements (VNEs) 330, 332, 334, etc., that perform some or all of the functions of network elements 150, 152, 154, 156, etc. For example, the network architecture can provide a substrate of networking capability, often called Network Function Virtualization Infrastructure (NFVI) or simply infrastructure that is capable of being directed with software and Software Defined Networking (SDN) protocols to perform a broad variety of network functions and services. This infrastructure can include several types of substrates. The most typical type of substrate being servers that support Network Function Virtualization (NFV), followed by packet forwarding capabilities based on generic computing resources, with specialized network technologies brought to bear when general purpose processors or general purpose integrated circuit devices offered by merchants (referred to herein as merchant silicon) are not appropriate. In this case, communication services can be implemented as cloud-centric workloads.

As an example, a traditional network element 150 (shown in FIG. 1), such as an edge router can be implemented via a VNE 330 composed of NFV software modules, merchant silicon, and associated controllers. The software can be written so that increasing workload consumes incremental resources from a common resource pool, and moreover so that it's elastic: so the resources are only consumed when needed. In a similar fashion, other network elements such as other routers, switches, edge caches, and middle-boxes are instantiated from the common resource pool. Such sharing of infrastructure across a broad set of uses makes planning and growing infrastructure easier to manage.

In an embodiment, the transport layer 350 includes fiber, cable, wired and/or wireless transport elements, network elements and interfaces to provide broadband access 110, wireless access 120, voice access 130, media access 140 and/or access to content sources 175 for distribution of content to any or all of the access technologies. In particular, in some cases a network element needs to be positioned at a specific place, and this allows for less sharing of common infrastructure. Other times, the network elements have specific physical layer adapters that cannot be abstracted or virtualized, and might require special DSP code and analog front-ends (AFEs) that do not lend themselves to implementation as VNEs 330, 332 or 334. These network elements can be included in transport layer 350.

The virtualized network function cloud 325 interfaces with the transport layer 350 to provide the VNEs 330, 332, 334, etc., to provide specific NFVs. In particular, the virtualized network function cloud 325 leverages cloud operations, applications, and architectures to support networking workloads. The virtualized network elements 330, 332 and 334 can employ network function software that provides either a one-for-one mapping of traditional network element function or alternately some combination of network functions designed for cloud computing. For example, VNEs 330, 332 and 334 can include route reflectors, domain name system (DNS) servers, and dynamic host configuration protocol (DHCP) servers, system architecture evolution (SAE) and/or mobility management entity (MME) gateways, broadband network gateways, IP edge routers for IP-VPN, Ethernet and other services, load balancers, distributors and other network elements. Because these elements don't typically need to forward large amounts of traffic, their workload can be distributed across a number of servers—each of which adds a portion of the capability, and overall which creates an elastic function with higher availability than its former monolithic version. These virtual network elements 330, 332, 334, etc., can be instantiated and managed using an orchestration approach similar to those used in cloud compute services.

The cloud computing environments 375 can interface with the virtualized network function cloud 325 via APIs that expose functional capabilities of the VNEs 330, 332, 334, etc., to provide the flexible and expanded capabilities to the virtualized network function cloud 325. In particular, network workloads may have applications distributed across the virtualized network function cloud 325 and cloud computing environment 375 and in the commercial cloud, or might simply orchestrate workloads supported entirely in NFV infrastructure from these third party locations.

In at least some embodiments, the virtualized communication network 300 includes one or more optimizers 382, such as a provider optimizer 245 (FIG. 2B), an ISP optimizing engine 216 (FIG. 2A), and or a user, subscriber or consumer optimizer 247 (FIG. 2B). It is understood that in at least some instances, one or more of the optimizers 382 can be implemented in whole or in part using virtualized network resources. The optimizers 382, when provided, can be adapted to perform one or more of the various techniques disclosed herein, such as dynamic pricing, coordinating storage of at least some content, such as popular content at edge nodes of a content delivery network and/or pre-fetching and/or serving request for network content using P2P network techniques, and the like.

Figure 4:
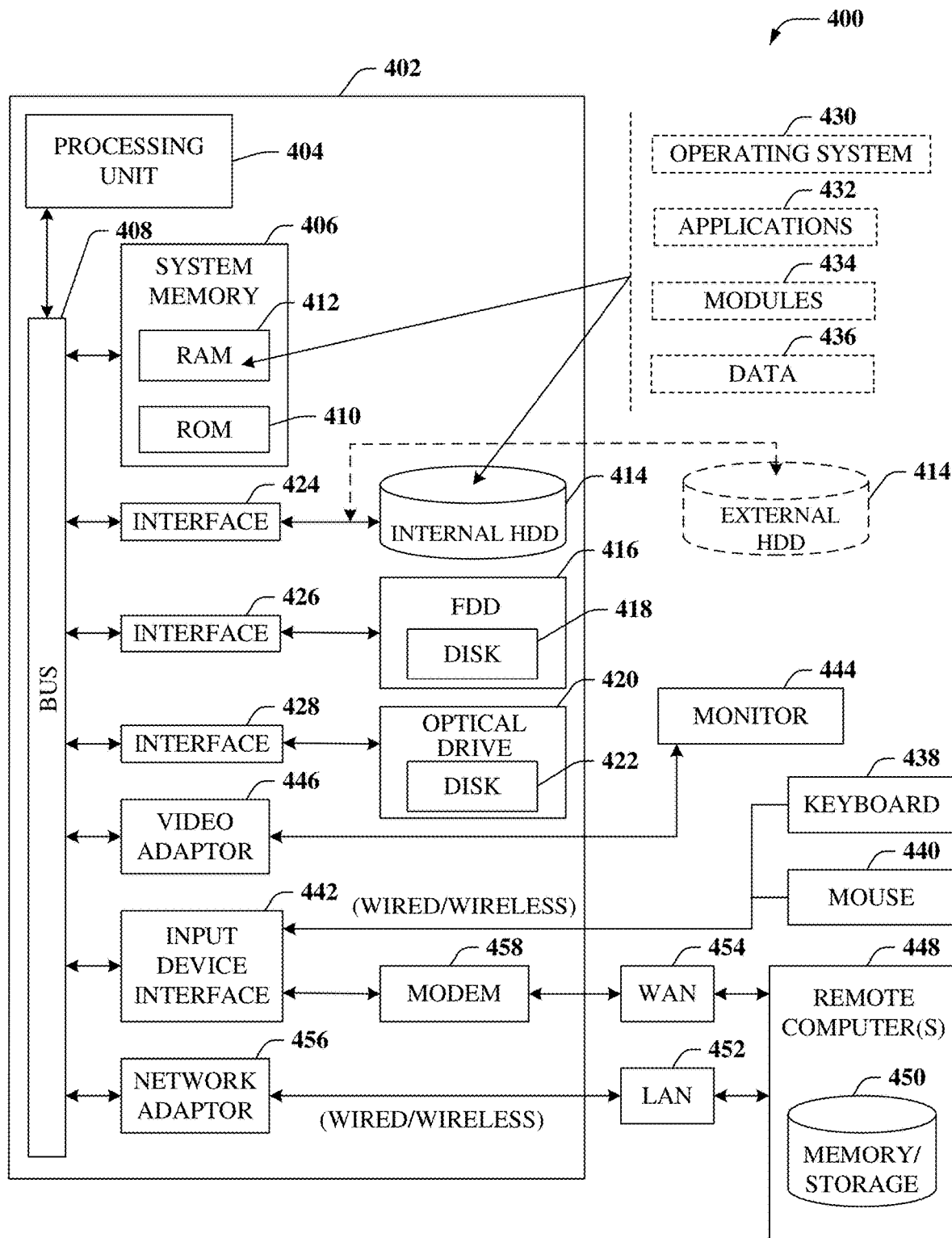
FIG. 4 is a block diagram of an example, non-limiting embodiment of a computing environment in accordance with various aspects described herein.

Turning now to FIG. 4, there is illustrated a block diagram of a computing environment in accordance with various aspects described herein. In order to provide additional context for various embodiments of the embodiments described herein, FIG. 4 and the following discussion are intended to provide a brief, general description of a suitable computing environment 400 in which the various embodiments of the subject disclosure can be implemented. In particular, computing environment 400 can be used in the implementation of network elements 150, 152, 154, 156, access terminal 112, base station or access point 122, switching device 132, media terminal 142, and/or VNEs 330, 332, 334, etc. Each of these devices can be implemented via computer-executable instructions that can run on one or more computers, and/or in combination with other program modules and/or as a combination of hardware and software. For example, computing environment 400 can facilitate in whole or in part one or more of dynamic pricing, storing at least some content, such as popular content at edge nodes of a content delivery network and/or pre-fetching and/or serving request for network content using P2P network techniques.

Generally, program modules comprise routines, programs, components, data structures, etc., that perform particular tasks or implement particular abstract data types. Moreover, those skilled in the art will appreciate that the inventive methods can be practiced with other computer system configurations, comprising single-processor or multiprocessor computer systems, minicomputers, mainframe computers, as well as personal computers, hand-held computing devices, microprocessor-based or programmable consumer electronics, and the like, each of which can be operatively coupled to one or more associated devices.

As used herein, a processing circuit includes one or more processors as well as other application specific circuits such as an application specific integrated circuit, digital logic circuit, state machine, programmable gate array or other circuit that processes input signals or data and that produces output signals or data in response thereto. It should be noted that while any functions and features described herein in association with the operation of a processor could likewise be performed by a processing circuit.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data or unstructured data.

Computer-readable storage media can comprise, but are not limited to, random access memory (RAM), read only memory (ROM), electrically erasable programmable read only memory (EEPROM), flash memory or other memory technology, compact disk read only memory (CD-ROM), digital versatile disk (DVD) or other optical disk storage, magnetic cassettes, magnetic tape, magnetic disk storage or other magnetic storage devices or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

With reference again to FIG. 4, the example environment can comprise a computer 402, the computer 402 comprising a processing unit 404, a system memory 406 and a system bus 408. The system bus 408 couples system components including, but not limited to, the system memory 406 to the processing unit 404. The processing unit 404 can be any of various commercially available processors. Dual microprocessors and other multiprocessor architectures can also be employed as the processing unit 404.

The system bus 408 can be any of several types of bus structure that can further interconnect to a memory bus (with or without a memory controller), a peripheral bus, and a local bus using any of a variety of commercially available bus architectures. The system memory 406 comprises ROM 410 and RAM 412. A basic input/output system (BIOS) can be stored in a non-volatile memory such as ROM, erasable programmable read only memory (EPROM), EEPROM, which BIOS contains the basic routines that help to transfer information between elements within the computer 402, such as during startup. The RAM 412 can also comprise a high-speed RAM such as static RAM for caching data.

The computer 402 further comprises an internal hard disk drive (HDD) 414 (e.g., EIDE, SATA), which internal HDD 414 can also be configured for external use in a suitable chassis (not shown), a magnetic floppy disk drive (FDD) 416, (e.g., to read from or write to a removable diskette 418) and an optical disk drive 420, (e.g., reading a CD-ROM disk 422 or, to read from or write to other high capacity optical media such as the DVD). The HDD 414, magnetic FDD 416 and optical disk drive 420 can be connected to the system bus 408 by a hard disk drive interface 424, a magnetic disk drive interface 426 and an optical drive interface 428, respectively. The hard disk drive interface 424 for external drive implementations comprises at least one or both of Universal Serial Bus (USB) and Institute of Electrical and Electronics Engineers (IEEE) 1394 interface technologies.

Other external drive connection technologies are within contemplation of the embodiments described herein.

The drives and their associated computer-readable storage media provide nonvolatile storage of data, data structures, computer-executable instructions, and so forth. For the computer 402, the drives and storage media accommodate the storage of any data in a suitable digital format. Although the description of computer-readable storage media above refers to a hard disk drive (HDD), a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods described herein.

A number of program modules can be stored in the drives and RAM 412, comprising an operating system 430, one or more application programs 432, other program modules 434 and program data 436. All or portions of the operating system, applications, modules, and/or data can also be stored or cached in the RAM 412. The systems and methods described herein can be implemented utilizing various commercially available operating systems or combinations of operating systems.

A user can enter commands and information into the computer 402 through one or more wired/wireless input devices, e.g., a keyboard 438 and a pointing device, such as a mouse 440. Other input devices (not shown) can comprise a microphone, an infrared (IR) remote control, a joystick, a game pad, a stylus pen, touch screen or the like. These and other input devices are often connected to the processing unit 404 through an input device interface 442 that can be coupled to the system bus 408, but can be connected by other interfaces, such as a parallel port, an IEEE 1394 serial port, a game port, a universal serial bus (USB) port, an IR interface, etc.

A monitor 444 or other type of display device can be also connected to the system bus 408 via an interface, such as a video adapter 446. It will also be appreciated that in alternative embodiments, a monitor 444 can also be any display device (e.g., another computer having a display, a smart phone, a tablet computer, etc.) for receiving display information associated with computer 402 via any communication means, including via the Internet and cloud-based networks. In addition to the monitor 444, a computer typically comprises other peripheral output devices (not shown), such as speakers, printers, etc.

The computer 402 can operate in a networked environment using logical connections via wired and/or wireless communications to one or more remote computers, such as a remote computer(s) 448. The remote computer(s) 448 can be a workstation, a server computer, a router, a personal computer, portable computer, microprocessor-based entertainment appliance, a peer device or other common network node, and typically comprises many or all of the elements described relative to the computer 402, although, for purposes of brevity, only a remote memory/storage device 450 is illustrated. The logical connections depicted comprise wired/wireless connectivity to a local area network (LAN) 452 and/or larger networks, e.g., a wide area network (WAN) 454. Such LAN and WAN networking environments are commonplace in offices and companies, and facilitate enterprise-wide computer networks, such as intranets, all of which can connect to a global communications network, e.g., the Internet.

When used in a LAN networking environment, the computer 402 can be connected to the LAN 452 through a wired and/or wireless communication network interface or adapter 456. The adapter 456 can facilitate wired or wireless communication to the LAN 452, which can also comprise a wireless AP disposed thereon for communicating with the adapter 456.

When used in a WAN networking environment, the computer 402 can comprise a modem 458 or can be connected to a communications server on the WAN 454 or has other means for establishing communications over the WAN 454, such as by way of the Internet. The modem 458, which can be internal or external and a wired or wireless device, can be connected to the system bus 408 via the input device interface 442. In a networked environment, program modules depicted relative to the computer 402 or portions thereof, can be stored in the remote memory/storage device 450. It will be appreciated that the network connections shown are example and other means of establishing a communications link between the computers can be used.

The computer 402 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can comprise Wireless Fidelity (Wi-Fi) and BLUETOOTH® wireless technologies. Thus, the communication can be a predefined structure as with a conventional network or simply an ad hoc communication between at least two devices.

Wi-Fi can allow connection to the Internet from a couch at home, a bed in a hotel room or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, n, ac, ag, etc.) to provide secure, reliable, fast wireless connectivity. A Wi-Fi network can be used to connect computers to each other, to the Internet, and to wired networks (which can use IEEE 802.3 or Ethernet). Wi-Fi networks operate in the unlicensed 2.4 and 5 GHz radio bands for example or with products that contain both bands (dual band), so the networks can provide real-world performance similar to the basic 10BaseT wired Ethernet networks used in many offices.

Figure 5:
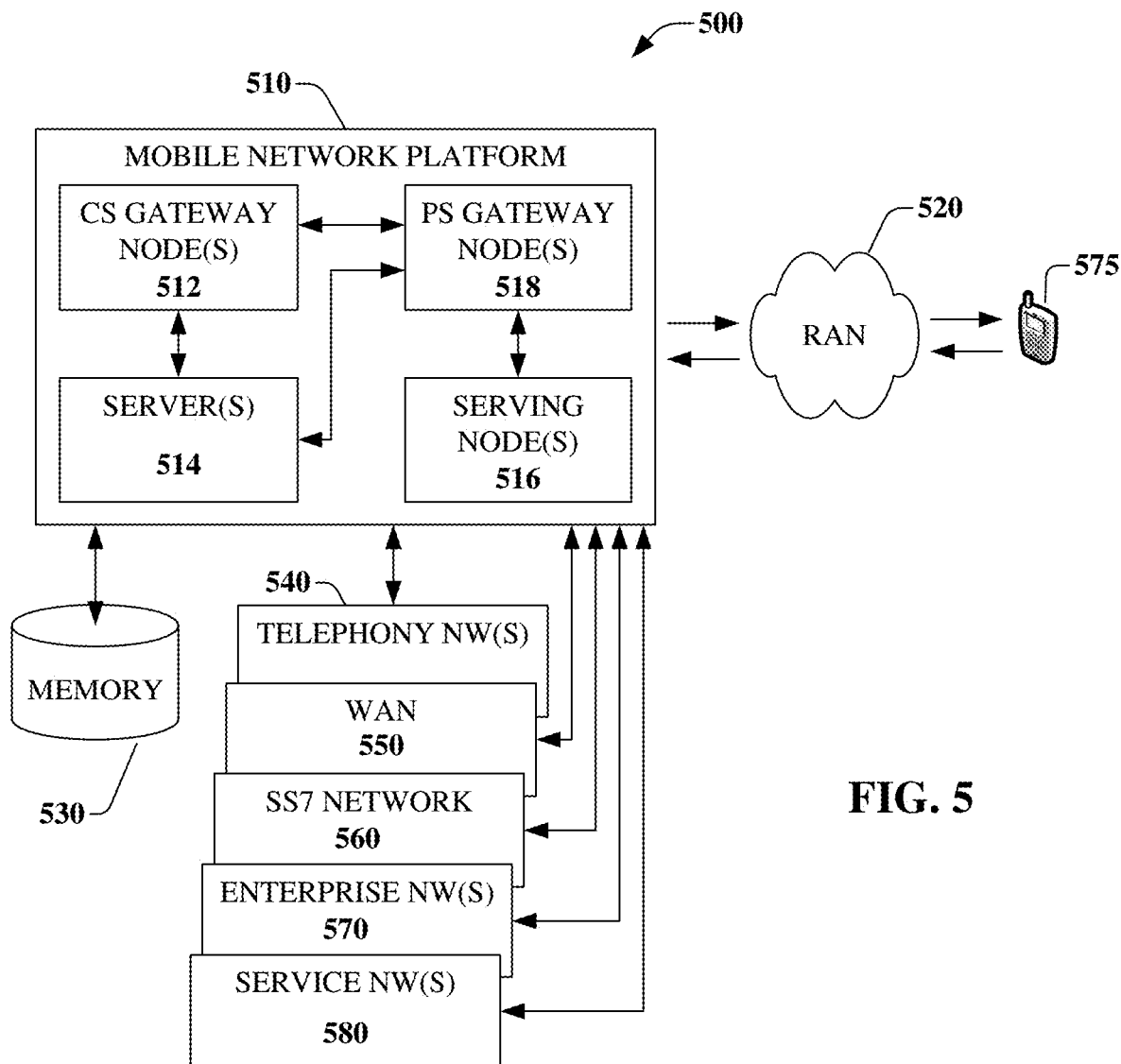
FIG. 5 is a block diagram of an example, non-limiting embodiment of a mobile network platform in accordance with various aspects described herein.

Turning now to FIG. 5, an embodiment 500 of a mobile network platform 510 is shown that is an example of network elements 150, 152, 154, 156, and/or VNEs 330, 332, 334, etc. For example, platform 510 can facilitate in whole or in part one or more of dynamic pricing, storing at least some content, such as popular content at edge nodes of a content delivery network and/or pre-fetching and/or serving request for network content using P2P network techniques. In one or more embodiments, the mobile network platform 510 can generate and receive signals transmitted and received by base stations or access points such as base station or access point 122. Generally, mobile network platform 510 can comprise components, e.g., nodes, gateways, interfaces, servers, or disparate platforms, that facilitate both packet-switched (PS) (e.g., internet protocol (IP), frame relay, asynchronous transfer mode (ATM)) and circuit-switched (CS) traffic (e.g., voice and data), as well as control generation for networked wireless telecommunication. As a non-limiting example, mobile network platform 510 can be included in telecommunications carrier networks, and can be considered carrier-side components as discussed elsewhere herein. Mobile network platform 510 comprises CS gateway node(s) 512 which can interface CS traffic received from legacy networks like telephony network(s) 540 (e.g., public switched telephone network (PSTN), or public land mobile network (PLMN)) or a signaling system #7 (SS7) network 560. CS gateway node(s) 512 can authorize and authenticate traffic (e.g., voice) arising from such networks. Additionally, CS gateway node(s) 512 can access mobility, or roaming, data generated through SS7 network 560; for instance, mobility data stored in a visited location register (VLR), which can reside in memory 530. Moreover, CS gateway node(s) 512 interfaces CS-based traffic and signaling and PS gateway node(s) 518. As an example, in a 3GPP UMTS network, CS gateway node(s) 512 can be realized at least in part in gateway GPRS support node(s) (GGSN). It should be appreciated that functionality and specific operation of CS gateway node(s) 512, PS gateway node(s) 518, and serving node(s) 516, is provided and dictated by radio technology(ies) utilized by mobile network platform 510 for telecommunication over a radio access network 520 with other devices, such as a radiotelephone 575.

In addition to receiving and processing CS-switched traffic and signaling, PS gateway node(s) 518 can authorize and authenticate PS-based data sessions with served mobile devices. Data sessions can comprise traffic, or content(s), exchanged with networks external to the mobile network platform 510, like wide area network(s) (WANs) 550, enterprise network(s) 570, and service network(s) 580, which can be embodied in local area network(s) (LANs), can also be interfaced with mobile network platform 510 through PS gateway node(s) 518. It is to be noted that WANs 550 and enterprise network(s) 570 can embody, at least in part, a service network(s) like IP multimedia subsystem (IMS). Based on radio technology layer(s) available in technology resource(s) or radio access network 520, PS gateway node(s) 518 can generate packet data protocol contexts when a data session is established; other data structures that facilitate routing of packetized data also can be generated. To that end, in an aspect, PS gateway node(s) 518 can comprise a tunnel interface (e.g., tunnel termination gateway (TTG) in 3GPP UMTS network(s) (not shown)) which can facilitate packetized communication with disparate wireless network(s), such as Wi-Fi networks.

In embodiment 500, mobile network platform 510 also comprises serving node(s) 516 that, based upon available radio technology layer(s) within technology resource(s) in the radio access network 520, convey the various packetized flows of data streams received through PS gateway node(s) 518. It is to be noted that for technology resource(s) that rely primarily on CS communication, server node(s) can deliver traffic without reliance on PS gateway node(s) 518; for example, server node(s) can embody at least in part a mobile switching center. As an example, in a 3GPP UMTS network, serving node(s) 516 can be embodied in serving GPRS support node(s) (SGSN).

For radio technologies that exploit packetized communication, server(s) 514 in mobile network platform 510 can execute numerous applications that can generate multiple disparate packetized data streams or flows, and manage (e.g., schedule, queue, format . . . ) such flows. Such application(s) can comprise add-on features to standard services (for example, provisioning, billing, customer support . . . ) provided by mobile network platform 510. Data streams (e.g., content(s) that are part of a voice call or data session) can be conveyed to PS gateway node(s) 518 for authorization/authentication and initiation of a data session, and to serving node(s) 516 for communication thereafter. In addition to application server, server(s) 514 can comprise utility server(s), a utility server can comprise a provisioning server, an operations and maintenance server, a security server that can implement at least in part a certificate authority and firewalls as well as other security mechanisms, and the like. In an aspect, security server(s) secure communication served through mobile network platform 510 to ensure network's operation and data integrity in addition to authorization and authentication procedures that CS gateway node(s) 512 and PS gateway node(s) 518 can enact. Moreover, provisioning server(s) can provision services from external network(s) like networks operated by a disparate service provider; for instance, WAN 550 or Global Positioning System (GPS) network(s) (not shown). Provisioning server(s) can also provision coverage through networks associated to mobile network platform 510 (e.g., deployed and operated by the same service provider), such as the distributed antennas networks shown in FIG. 1(*s*) that enhance wireless service coverage by providing more network coverage.

It is to be noted that server(s) 514 can comprise one or more processors configured to confer at least in part the functionality of mobile network platform 510. To that end, the one or more processor can execute code instructions stored in memory 530, for example. It is should be appreciated that server(s) 514 can comprise a content manager, which operates in substantially the same manner as described hereinbefore.

In example embodiment 500, memory 530 can store information related to operation of mobile network platform 510. Other operational information can comprise provisioning information of mobile devices served through mobile network platform 510, subscriber databases; application intelligence, pricing schemes, e.g., promotional rates, flat-rate programs, couponing campaigns; technical specification(s) consistent with telecommunication protocols for operation of disparate radio, or wireless, technology layers; and so forth. Memory 530 can also store information from at least one of telephony network(s) 540, WAN 550, SS7 network 560, or enterprise network(s) 570. In an aspect, memory 530 can be, for example, accessed as part of a data store component or as a remotely connected memory store.

In order to provide a context for the various aspects of the disclosed subject matter, FIG. 5, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules comprise routines, programs, components, data structures, etc., that perform particular tasks and/or implement particular abstract data types.

Figure 6:
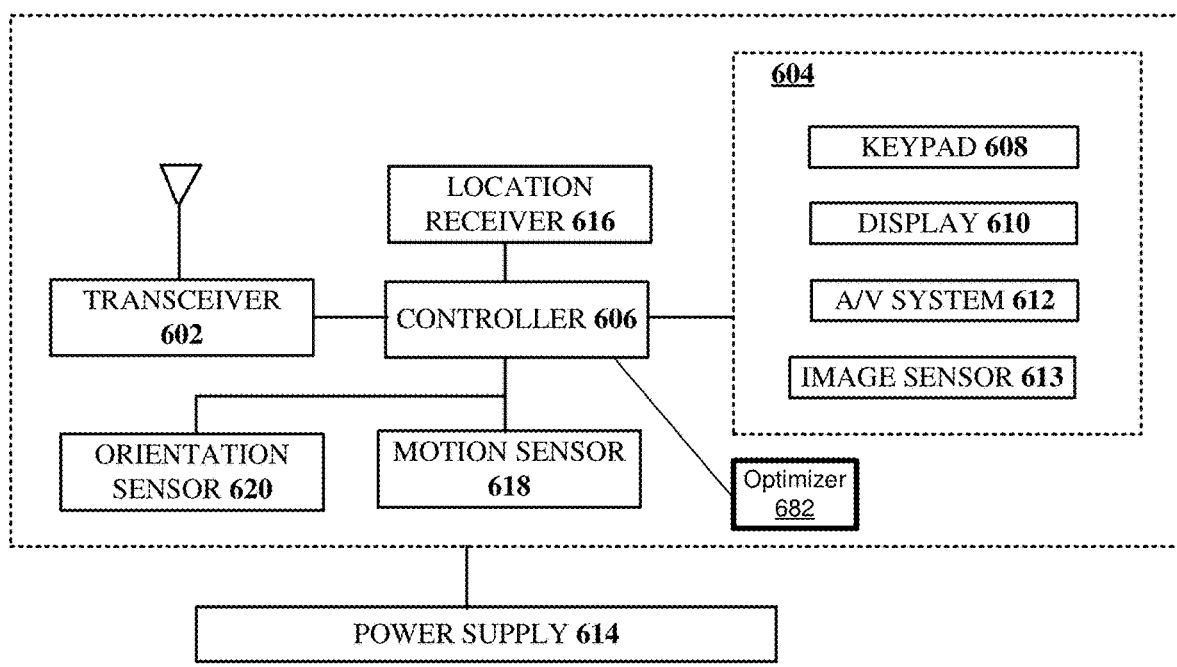
FIG. 6 is a block diagram of an example, non-limiting embodiment of a communication device in accordance with various aspects described herein.

Turning now to FIG. 6, an illustrative embodiment of a communication device 600 is shown. The communication device 600 can serve as an illustrative embodiment of devices such as data terminals 114, mobile devices 124, vehicle 126, display devices 144 or other client devices for communication via either communications network 125. For example, computing device 600 can facilitate in whole or in part one or more of dynamic pricing, storing at least some content, such as popular content at edge nodes of a content delivery network and/or pre-fetching and/or serving request for network content using P2P network techniques.

The communication device 600 can comprise a wireline and/or wireless transceiver 602 (herein transceiver 602), a user interface (UI) 604, a power supply 614, a location receiver 616, a motion sensor 618, an orientation sensor 620, and a controller 606 for managing operations thereof. The transceiver 602 can support short-range or long-range wireless access technologies such as Bluetooth®, ZigBee®, WiFi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1x, UMTS/HSDPA, GSM/GPRS, TDMA/EDGE, EV/DO, WiMAX, SDR, LTE, as well as other next generation wireless communication technologies as they arise. The transceiver 602 can also be adapted to support circuit-switched wireline access technologies (such as PSTN), packet-switched wireline access technologies (such as TCP/IP, VoIP, etc.), and combinations thereof.

The UI 604 can include a depressible or touch-sensitive keypad 608 with a navigation mechanism such as a roller ball, a joystick, a mouse, or a navigation disk for manipulating operations of the communication device 600. The keypad 608 can be an integral part of a housing assembly of the communication device 600 or an independent device operably coupled thereto by a tethered wireline interface (such as a USB cable) or a wireless interface supporting for example Bluetooth®. The keypad 608 can represent a numeric keypad commonly used by phones, and/or a QWERTY keypad with alphanumeric keys. The UI 604 can further include a display 610 such as monochrome or color LCD (Liquid Crystal Display), OLED (Organic Light Emitting Diode) or other suitable display technology for conveying images to an end user of the communication device 600. In an embodiment where the display 610 is touch-sensitive, a portion or all of the keypad 608 can be presented by way of the display 610 with navigation features. The UI 604 can be adapted to perform any of the UI functions disclosed herein, such as accepting requests for network content, providing notification of adjusted pricing, presenting selectable options for accepting and/or otherwise modifying requests, e.g., based on adjusted pricing, and so on.

The display 610 can use touch screen technology to also serve as a user interface for detecting user input. As a touch screen display, the communication device 600 can be adapted to present a user interface having graphical user interface (GUI) elements that can be selected by a user with a touch of a finger. The display 610 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 610 can be an integral part of the housing assembly of the communication device 600 or an independent device communicatively coupled thereto by a tethered wireline interface (such as a cable) or a wireless interface.

The UI 604 can also include an audio system 612 that utilizes audio technology for conveying low volume audio (such as audio heard in proximity of a human ear) and high volume audio (such as speakerphone for hands free operation). The audio system 612 can further include a microphone for receiving audible signals of an end user. The audio system 612 can also be used for voice recognition applications. The UI 604 can further include an image sensor 613 such as a charged coupled device (CCD) camera for capturing still or moving images.

The power supply 614 can utilize common power management technologies such as replaceable and rechargeable batteries, supply regulation technologies, and/or charging system technologies for supplying energy to the components of the communication device 600 to facilitate long-range or short-range portable communications. Alternatively, or in combination, the charging system can utilize external power sources such as DC power supplied over a physical interface such as a USB port or other suitable tethering technologies.

The location receiver 616 can utilize location technology such as a global positioning system (GPS) receiver capable of assisted GPS for identifying a location of the communication device 600 based on signals generated by a constellation of GPS satellites, which can be used for facilitating location services such as navigation. The motion sensor 618 can utilize motion sensing technology such as an accelerometer, a gyroscope, or other suitable motion sensing technology to detect motion of the communication device 600 in three-dimensional space. The orientation sensor 620 can utilize orientation sensing technology such as a magnetometer to detect the orientation of the communication device 600 (north, south, west, and east, as well as combined orientations in degrees, minutes, or other suitable orientation metrics).

The communication device 600 can use the transceiver 602 to also determine a proximity to a cellular, WiFi, Bluetooth®, or other wireless access points by sensing techniques such as utilizing a received signal strength indicator (RSSI) and/or signal time of arrival (TOA) or time of flight (TOF) measurements. The controller 606 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 600.

In at least some embodiments, the communication device 600 includes one or more optimizers 682, such as a provider optimizer 245 (FIG. 2B), an ISP optimizing engine 216 (FIG. 2A), and or a user, subscriber or consumer optimizer 247 (FIG. 2B). The optimizers 682, when provided, can be adapted to perform one or more of the various techniques disclosed herein, such as dynamic pricing, coordinating storage of at least some content, such as popular content at edge nodes of a content delivery network and/or pre-fetching and/or serving request for network content using P2P network techniques, and the like.

Other components not shown in FIG. 6 can be used in one or more embodiments of the subject disclosure. For instance, the communication device 600 can include a slot for adding or removing an identity module such as a Subscriber Identity Module (SIM) card or Universal Integrated Circuit Card (UICC). SIM or UICC cards can be used for identifying subscriber services, executing programs, storing subscriber data, and so on.

The techniques disclosed herein, including the illustrative embodiments, are believed to be more comprehensive and holistic than previous solutions. For example, by combining dynamic pricing with the optimizers, user interfaces and hybrid content delivery networks and P2P network, network congestion can be reduced while still satisfying consumer needs.

According to the disclosed techniques, an ISP can reduce infrastructure cost on content delivery networks by combining content delivery networks with P2P networks. Such techniques can reduce network congestion during peak-hours, by having local copies available proximal to anticipated user requests. Additionally, the disclosed techniques promote or otherwise provide infrastructure to increase or otherwise maximize revenue through implementation of dynamic pricing. It is envisioned that one or more of the disclosed techniques provide additional benefits of keeping customers happier through dynamic pricing, to promote customer loyalty and to entice new customers.

Other benefits offered by the disclosed techniques include, without limitation, generation of revenue for peers of the network, who are willing share access to their personal infrastructure and/or content. In at least some instances, the techniques, e.g., content delivery networks and/or P2P can be extended to other network providers that are solving similar problems through licensing arrangements. Still further, it is envisioned that peer sharing and/or placement of edge nodes can be accomplished in a manner that facilitates deployment of Internet connectivity to certain locations faster, by not having to deploy last-mile cable and leveraging free spectrum.

Although several of the illustrative embodiments relate to terrestrial networks and/or mobile networks, it is understood that the inventive techniques are applicable, without limitation, in other domains other than data usage for wired and wireless services. For example, the techniques can be used for satellite capacity, cloud computing services, terrestrial radio service, voice plans, text plans and the like.

It is also highly applicable international as well as nationally. As explained in the introduction very few ISP offer dynamic pricing but surveys indicate there is a great interest in it. An ISP could license the patent to other companies that would like to charge based on dynamic pricing.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can comprise both volatile and nonvolatile memory, by way of illustration, and not limitation, volatile memory, non-volatile memory, disk storage, and memory storage. Further, non-volatile memory can be included in read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Moreover, it will be noted that the disclosed subject matter can be practiced with other computer system configurations, comprising single-processor or multiprocessor computer systems, mini-computing devices, mainframe computers, as well as personal computers, hand-held computing devices (e.g., PDA, phone, smartphone, watch, tablet computers, netbook computers, etc.), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

In one or more embodiments, information regarding use of services can be generated including services being accessed, media consumption history, user preferences, and so forth. This information can be obtained by various methods including user input, detecting types of communications (e.g., video content vs. audio content), analysis of content streams, sampling, and so forth. The generating, obtaining and/or monitoring of this information can be responsive to an authorization provided by the user. In one or more embodiments, an analysis of data can be subject to authorization from user(s) associated with the data, such as an opt-in, an opt-out, acknowledgement requirements, notifications, selective authorization based on types of data, and so forth.

Some of the embodiments described herein can also employ artificial intelligence (AI) to facilitate automating one or more features described herein. The embodiments (e.g., in connection with automatically identifying acquired cell sites that provide a maximum value/benefit after addition to an existing communication network) can employ various AI-based schemes for carrying out various embodiments thereof. Moreover, the classifier can be employed to determine a ranking or priority of each cell site of the acquired network. A classifier is a function that maps an input attribute vector, $x=(x1, x2, x3, x4, \ldots, xn)$, to a confidence that the input belongs to a class, that is, $f(x)$ =confidence (class). Such classification can employ a probabilistic and/or statistical-based analysis (e.g., factoring into the analysis utilities and costs) to determine or infer an action that a user desires to be automatically performed. A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches comprise, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated, one or more of the embodiments can employ classifiers that are explicitly trained (e.g., via a generic training data) as well as implicitly trained (e.g., via observing UE behavior, operator preferences, historical information, receiving extrinsic information). For example, SVMs can be configured via a learning or training phase within a classifier constructor and feature selection module. Thus, the classifier(s) can be used to automatically learn and perform a number of functions, including but not limited to determining according to predetermined criteria which of the acquired cell sites will benefit a maximum number of subscribers and/or which of the acquired cell sites will add minimum value to the existing communication network coverage, etc.

As used in some contexts in this application, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable device or computer-readable storage/communications media. For example, computer readable storage media can include, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or". That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "user equipment," "mobile station," "mobile," subscriber station," "access terminal," "terminal," "handset," "mobile device" (and/or terms representing similar terminology) can refer to a wireless device utilized by a subscriber or user of a wireless communication service to receive or convey data, control, voice, video, sound, gaming or substantially any data-stream or signaling-stream. The foregoing terms are utilized interchangeably herein and with reference to the related drawings.

Furthermore, the terms "user," "subscriber," "customer," "consumer" and the like are employed interchangeably throughout, unless context warrants particular distinctions among the terms. It should be appreciated that such terms can refer to human entities or automated components supported through artificial intelligence (e.g., a capacity to make inference based, at least, on complex mathematical formalisms), which can provide simulated vision, sound recognition and so forth.

As employed herein, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components or any combination thereof designed to perform the functions described herein. Processors can exploit nano-scale architectures such as, but not limited to, molecular and quantum-dot based transistors, switches and gates, in order to optimize space usage or enhance performance of user equipment. A processor can also be implemented as a combination of computing processing units.

As used herein, terms such as "data storage," data storage," "database," and substantially any other information storage component relevant to operation and functionality of a component, refer to "memory components," or entities embodied in a "memory" or components comprising the memory. It will be appreciated that the memory components or computer-readable storage media, described herein can be either volatile memory or nonvolatile memory or can include both volatile and nonvolatile memory.

What has been described above includes mere examples of various embodiments. It is, of course, not possible to describe every conceivable combination of components or methodologies for purposes of describing these examples, but one of ordinary skill in the art can recognize that many further combinations and permutations of the present embodiments are possible. Accordingly, the embodiments disclosed and/or claimed herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

As may also be used herein, the term(s) "operably coupled to", "coupled to", and/or "coupling" includes direct coupling between items and/or indirect coupling between items via one or more intervening items. Such items and intervening items include, but are not limited to, junctions, communication paths, components, circuit elements, circuits, functional blocks, and/or devices. As an example of indirect coupling, a signal conveyed from a first item to a second item may be modified by one or more intervening items by modifying the form, nature or format of information in a signal, while one or more elements of the information in the signal are nevertheless conveyed in a manner than can be recognized by the second item. In a further example of indirect coupling, an action in a first item can cause a reaction on the second item, as a result of actions and/or reactions in one or more intervening items.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

What is claimed is:

1. A device, comprising:
a processing system including a processor; and
a memory that stores executable instructions that, when executed by the processing system, facilitate performance of operations, the operations comprising:
monitoring a bandwidth utilization of a network;
receiving a request provided by equipment of a user to access a finite content item by way of the network provided by a network service provider;
identifying a proximally stored copy of the finite content item, wherein the proximally stored copy was obtained from a content source responsive to a separate request;
adjusting, responsive to the bandwidth utilization exceeding a threshold, a data service price to obtain an adjusted data service price for transporting the finite content item to the equipment of the user;
forwarding a notification of the adjusted data service price to the equipment of the user;
obtaining from the equipment of the user an updated request for providing the finite content item to the equipment of the user at the adjusted data service price, wherein the updated request indicates acceptance of the adjusted data service price; and
initiating transport of the finite content item to the equipment of the user according to the updated request, wherein the initiating of the transport of the finite content item further comprises initiating transport of the proximally stored copy of the finite content item to the equipment of the user.

2. The device of claim 1, wherein the proximally stored copy is stored by equipment of another user and wherein the initiating of the transport of the finite content item comprises initiating transport of the proximally stored copy from the equipment of the another user to the equipment of the user via a peer-to-peer network.

3. The device of claim 2, wherein the equipment of the another user comprises wireless infrastructure, and wherein the proximally stored copy is obtained from the equipment of the another user via the wireless infrastructure without using a local infrastructure of the network service provider.

4. The device of claim 1, wherein the adjusting of the data service price further comprises optimizing the adjusted data service price based on one of the bandwidth utilization of the network, the finite content item, or both.

5. The device of claim 4, wherein the operations further comprise:
estimating an elasticity of the user; and
determining a cost of exceeding a capacity of the network, wherein the optimizing of the adjusted data service price is further based on one of the elasticity of the user, the cost of exceeding the capacity, or both.

6. The device of claim 1, wherein the operations further comprise determining a bandwidth granularity.

7. A non-transitory, machine-readable medium, comprising executable instructions that, when executed by a processing system including a processor, facilitate performance of operations, the operations comprising:
determining a bandwidth utilization of a network;
receiving a request provided by equipment of a user to access a requested network content item by way of the network provided by a network service provider;

identifying a proximally stored copy of the requested network content item, wherein the proximally stored copy was obtained from a content source responsive to a separate request;

adjusting, responsive to the bandwidth utilization exceeding a threshold, a data service price to obtain an adjusted data service price for transporting the requested network content item to the equipment of the user;

providing a notification of the adjusted data service price to the equipment of the user;

obtaining from the equipment of the user an updated request for providing the requested network content item to the equipment of the user at the adjusted data service price, wherein the updated request indicates acceptance of the adjusted data service price; and facilitating transport of the requested network content item to the equipment of the user according to the updated request, wherein the facilitating of the transport of the requested network content item further comprises initiating transport of the proximally stored copy of the requested network content item to the equipment of the user.

8. The non-transitory, machine-readable medium of claim 7, wherein the proximally stored copy is stored by equipment of another user and wherein the facilitating of the transport of the requested network content item comprises initiating transport of the proximally stored copy from the equipment of the another user to the equipment of the user via a peer-to-peer network.

9. The non-transitory, machine-readable medium of claim 8, wherein the equipment of the another user comprises wireless infrastructure, and wherein the proximally stored copy is obtained from the equipment of the another user via the wireless infrastructure without using a local infrastructure of the network service provider.

10. The non-transitory, machine-readable medium of claim 7, wherein the adjusting of the data service price further comprises optimizing the adjusted data service price based on one of the bandwidth utilization of the network, the requested network content item, or both.

11. The non-transitory, machine-readable medium of claim 10, wherein the operations further comprise:
estimating an elasticity of the user; and
determining a cost of exceeding a capacity of the network, wherein the optimizing of the adjusted data service price is further based on one of the elasticity of the user, the cost of exceeding the capacity, or both.

12. The non-transitory, machine-readable medium of claim 7, wherein the operations further comprise determining a bandwidth granularity, and applying the bandwidth granularity to the adjusting of the data service price.

13. A method, comprising:
determining, by a processing system including a processor, a bandwidth utilization of a network;
obtaining, by the processor, a request provided by equipment of a user to access a requested network content item by way of the network;

identifying, by the processing system, a proximally stored copy of the requested network content item, wherein the proximally stored copy was obtained from a content source responsive to a separate request;

adjusting, by the processing system, responsive to the bandwidth utilization exceeding a threshold, a data service price to obtain an adjusted data service price for transporting the requested network content item to the equipment of the user;

forwarding, by the processing system, a notification of the adjusted data service price to the equipment of the user;

obtaining, by the processing system, from the equipment of the user an updated request for providing the requested network content item to the equipment of the user at the adjusted data service price, wherein the updated request indicates acceptance of the adjusted data service price; and facilitating, by the processing system, transport of the requested network content item to the equipment of the user according to the updated request, wherein the facilitating of the transport of the requested network content item further comprises initiating transport of the proximally stored copy of the requested network content item to the equipment of the user.

14. The method of claim 13, wherein the proximally stored copy is stored by equipment of another user and wherein the facilitating of the transport of the requested network content item comprises initiating transport of the proximally stored copy from the equipment of the another user to the equipment of the user via a peer-to-peer network.

15. The method of claim 14, wherein the equipment of the other user comprises wireless infrastructure, and wherein the proximally stored copy is obtained from the equipment of the another user via the wireless infrastructure.

16. The method of claim 13, wherein the adjusting of the data service price further comprises optimizing the adjusted data service price based on one of the bandwidth utilization of the network, the requested network content item, or both.

17. The method of claim 16, further comprise:
estimating an elasticity of the user; and
determining a cost of exceeding a capacity of the network, wherein the optimizing of the adjusted data service price is further based on one of the elasticity of the user, the cost of exceeding the capacity, or both.

18. The device of claim 1, wherein the processing system comprises a plurality of processors operating in a distributed computing environment.

19. The non-transitory, machine-readable medium of claim 7, wherein the processing system comprises a plurality of processors operating in a distributed computing environment.

20. The method of claim 14, further comprising determining, by the processing system, a bandwidth granularity, and applying the bandwidth granularity to the adjusting of the data service price.

* * * * *